US009962686B2

(12) United States Patent
Yu et al.

(10) Patent No.: US 9,962,686 B2
(45) Date of Patent: May 8, 2018

(54) HYBRID NANOSTRUCTURED PHOTOCATALYSTS AND PREPARATION METHOD THEREOF

(71) Applicant: UNIVERSITY-INDUSTRY COOPERATION GROUP OF KYUNG HEE UNIVERSITY, Gyeonggi-do (KR)

(72) Inventors: Taekyung Yu, Seoul (KR); WooSik Kim, Seoul (KR); Aasim Shahzad, Gyeonggi-do (KR); Minyoung Yi, Gyeonggi-do (KR)

(73) Assignee: UNIVERSITY-INDUSTRY COOPERATION GROUP OF KYUNG HEE UNIVERSITY, Gyeonggi-Do (KR)

(*) Notice: Subject to any disclaimer, the term of this patent is extended or adjusted under 35 U.S.C. 154(b) by 0 days. days.

(21) Appl. No.: 15/428,123

(22) Filed: Feb. 8, 2017

(65) Prior Publication Data
US 2018/0008967 A1 Jan. 11, 2018

(30) Foreign Application Priority Data

Jul. 6, 2016 (KR) ........................ 10-2016-0085714

(51) Int. Cl.
*B01J 27/10* (2006.01)
*B01J 35/00* (2006.01)
(Continued)

(52) U.S. Cl.
CPC .............. *B01J 27/10* (2013.01); *B01J 23/50* (2013.01); *B01J 27/08* (2013.01); *B01J 31/06* (2013.01);
(Continued)

(58) Field of Classification Search
CPC ... B01J 27/08; B01J 27/10; B01J 23/50; B01J 31/06; B01J 31/064; B01J 31/26;
(Continued)

(56) References Cited

U.S. PATENT DOCUMENTS 5,468,603 A * 11/1995 Kub ................... G03C 1/49863
430/523
6,355,408 B1 * 3/2002 Whitcomb ......... G03C 1/49809
430/618
(Continued)

FOREIGN PATENT DOCUMENTS

| CN | 102909039 A | * 2/2013 | ............ B01J 27/135 |
|---|---|---|---|
| KR | 10-2012-0001769 | 1/2012 | |
| KR | 10-2016-0053352 | 5/2016 | |

OTHER PUBLICATIONS

"In situ oxidation synthesis of Ag/Ag/Cl core-shell nanowires and their photocatalytic properties," Yingpu Bi et al. Chemical Communications (2009), pp. 6551-6553.*
(Continued)

*Primary Examiner* — Patricia L. Hailey
(74) *Attorney, Agent, or Firm* — Parker Highlander PLLC

(57) ABSTRACT

The present invention relates to a hybrid nanostructured photocatalyst, comprising a first nanoparticle comprising silver halide (AgX); a second nanoparticle, which is formed on an outer surface of the first nanoparticle and comprises Ag; and a polymer formed on any one outer surface of the first nanoparticle and the second nanoparticle, and a preparation method thereof. Specifically, the present invention provides a hybrid nanostructured photocatalyst having a high photocatalytic activity in a visible light region and a preparation method thereof.

17 Claims, 18 Drawing Sheets

(51) Int. Cl.
| | |
|---|---|
| B01J 23/50 | (2006.01) |
| B01J 27/08 | (2006.01) |
| B01J 31/26 | (2006.01) |
| B01J 31/06 | (2006.01) |
| B01J 35/08 | (2006.01) |
| B01J 37/04 | (2006.01) |
| B01J 37/03 | (2006.01) |
| B01J 37/02 | (2006.01) |
| C02F 1/32 | (2006.01) |
| C02F 1/74 | (2006.01) |
| B01J 31/02 | (2006.01) |

(52) U.S. Cl.
 CPC ............ *B01J 31/26* (2013.01); *B01J 35/004* (2013.01); *B01J 35/0006* (2013.01); *B01J 35/0013* (2013.01); *B01J 35/08* (2013.01); *B01J 37/0221* (2013.01); *B01J 37/031* (2013.01); *B01J 37/04* (2013.01); *C02F 1/325* (2013.01); *C02F 1/74* (2013.01); *B01J 31/0241* (2013.01); *B01J 31/064* (2013.01); *C02F 2305/08* (2013.01); *C02F 2305/10* (2013.01)

(58) Field of Classification Search
 CPC .. B01J 35/0006; B01J 35/004; B01J 35/0046; B01J 35/08; B01J 37/0221; B01J 37/031; B01J 37/04; B01J 35/35; C02F 2305/08; C02F 2305/10
 USPC ................ 502/224, 347; 977/700, 754, 773; 428/403
 See application file for complete search history.

(56) References Cited

U.S. PATENT DOCUMENTS

| | | | | |
|---|---|---|---|---|
| 6,548,236 | B1* | 4/2003 | Irving ................ | G03C 1/49809 430/505 |
| 6,576,414 | B1* | 6/2003 | Irving ................ | G03C 1/49809 430/505 |
| 2004/0023164 | A1* | 2/2004 | Bokhonov ......... | G03C 1/49809 430/350 |
| 2012/0237872 | A1* | 9/2012 | Ohzeki .................. | B82Y 30/00 430/271.1 |
| 2013/0168228 | A1* | 7/2013 | Ozin ...................... | B01J 35/004 204/157.9 |

OTHER PUBLICATIONS

"Large-scale synthesis and enhanced visible-light-driven photocatalytic performance of hierarchical Ag/AgCl nanocrystals derived from freeze-dried PVP-Ag+ hybrid precursors with porosity," Deliang Chen et al. Applied Catalysis B: Environmental 144 (2014), pp. 304-307.*

"Porous AgCl/Ag Nanocomposites with Enhanced Visible Light Photocatalytic Properties," Yingying Li et al. J. Phys. Chem. C (2010), 114, pp. 3175-3179.*

"A novel in-situ synthesis and enhanced photocatalytic performance of Ag/AgBr/Ag2O/sulfonated polystyrene sphere heterostructure photocatalyst," Bing Song et al. Materials Letters (2017), pp. 1-3.*

"Sandwich-structured AgCl@Ag@TiO2 with excellent visible-light photocatalytic activity for organic pollutant degradation and *E. coli* K12 inactivation," Baozhu Tian et al. Applied Catalysis B: Environmental 158-159 (2014), pp. 76-84.*

"Ag@AgCl: A Highly Efficient and Stable Photocatalyst Active under Visible Light," Peng Wang et al. Angew. Chem. Int. Ed. 2008, 47, pp. 7931-7933.*

"Highly Efficient Visible-Light Plasmonic Photocatalyst Ag@AgBr," Peng Wang et al. Chemistry: A European Journal, 2009, 15, pp. 1821-1824.*

"Visible light photocatalytic activities of plasmonic Ag/AbBr particles synthesized by a double jet method," Desong Wang et al. Desalination 270 (2011), pp. 174-180.*

"Ionic liquid oxidation synthesis of Ag@AgCl core-shell structure for photocatalytic application under visible-light irradiation," Yuanguo Xu et al. Colloids and Surfaces A: Physicochemical and Engineering Aspects 416 (2013), pp. 80-85.*

"Synthesis of sandwich-structured AgBr@Ag@TiO2 composite photocatalyst and study of its photocatalytic performance for the oxidation of benzyl alcohols to benzaldehydes," Ping Zhang et al. Chemical Engineering Journal 306 (2016), pp. 1151-1161.*

An, Changhua, et al. "Converting AgCl nanocubes to sunlight-driven plasmonic AgCl: Ag nanophotocatalyst with high activity and durability." *Journal of Materials Chemistry* 21.31 (2011): 11532-11536.

Fu, Li, et al. "Electrodeposition of Ag dendrites/AgCl hybrid film as a novel photodetector." *Materials Letters* 142 (2015): 119-121.

Kuai, Long, et al. "Facile subsequently light-induced route to highly efficient and stable sunlight-driven Ag—AgBr plasmonic photocatalyst." *Langmuir* 26.24 (2010): 18723-18727.

Shahzad, Aasim, Taekyung Yu, and Woo-Sik Kim. "Controlling the morphology and composition of Ag/AgBr hybrid nanostructures and enhancing their visible light induced photocatalytic properties." *RSC Advances* 6.60 (2016): 54709-54717.

Shahzad, Aasim, Woo-Sik Kim, and Taekyung Yu. "Facile synthesis of Ag/AgCl hybrid nanostructures with tunable morphologies and compositions as advanced visible light plasmonic photocatalysts." *Dalton Transactions* 45.22 (2016): 9158-9165.

Shalaev, Vladimir M. "Transforming light." *Science* 322 (2008): 384-386.

Wang, Peng, et al. "Highly Efficient Visible-Light Plasmonic Photocatalyst Ag@AgBr." *Chemistry—A European Journal* 15.8 (2009): 1821-1824.

Xiao, Xinlai, et al. "A facile way to synthesize Ag@ AgBr cubic cages with efficient visible-light-induced photocatalytic activity." *Applied Catalysis B: Environmental* 163 (2015): 564-572.

* cited by examiner

[FIGS. 1a-h]
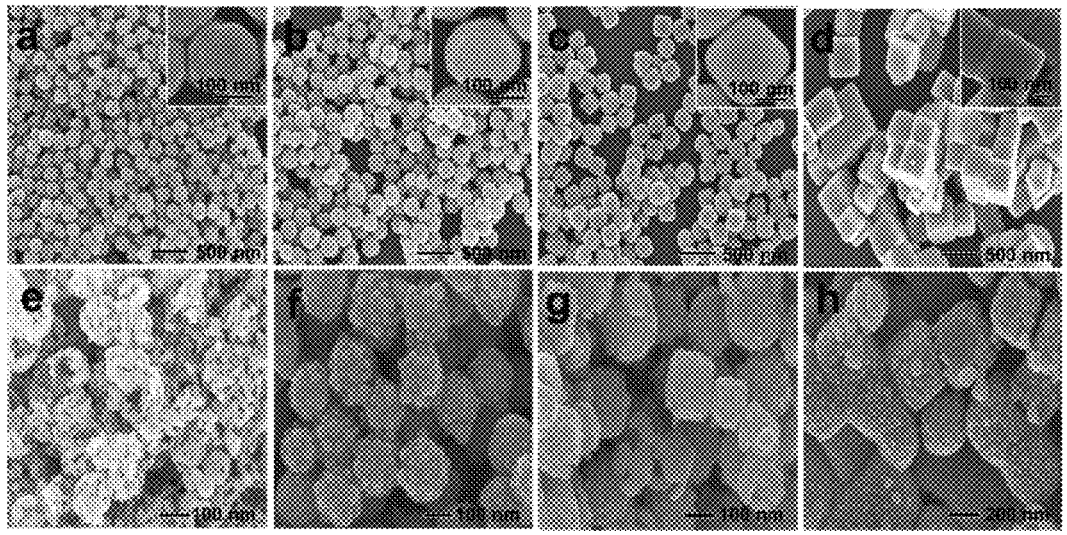
[FIG. 2]
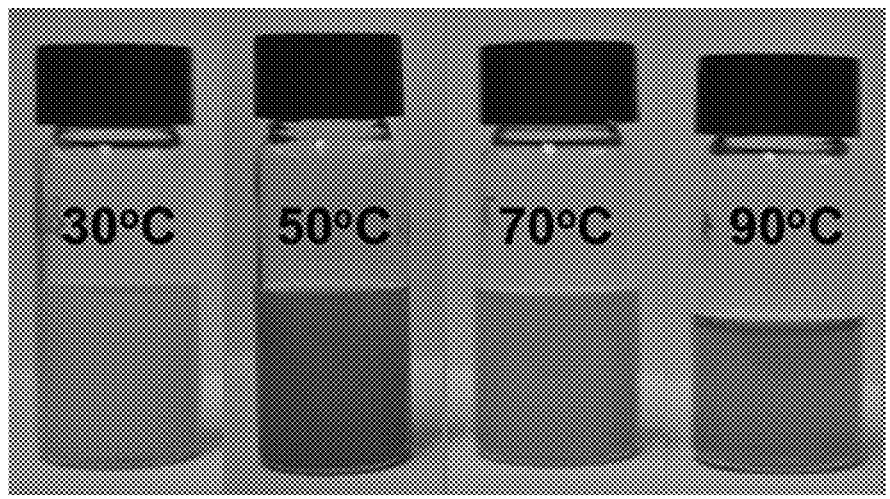

[FIG. 3]
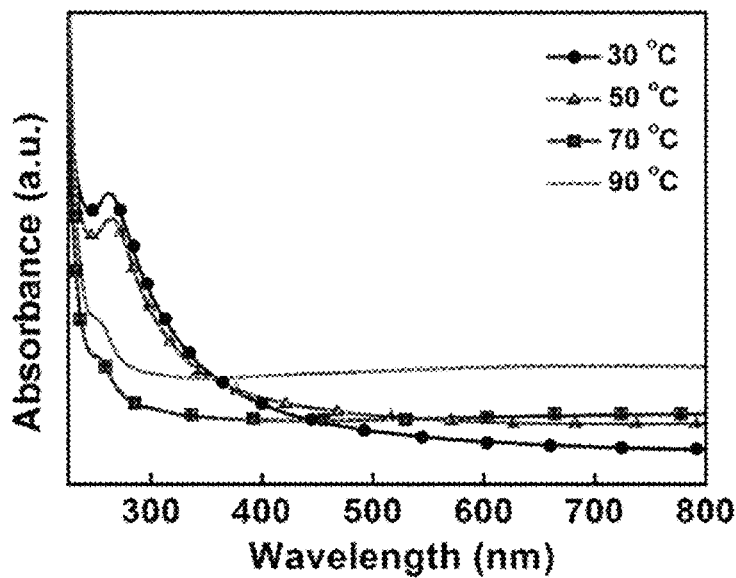
[FIGS. 4a-d]
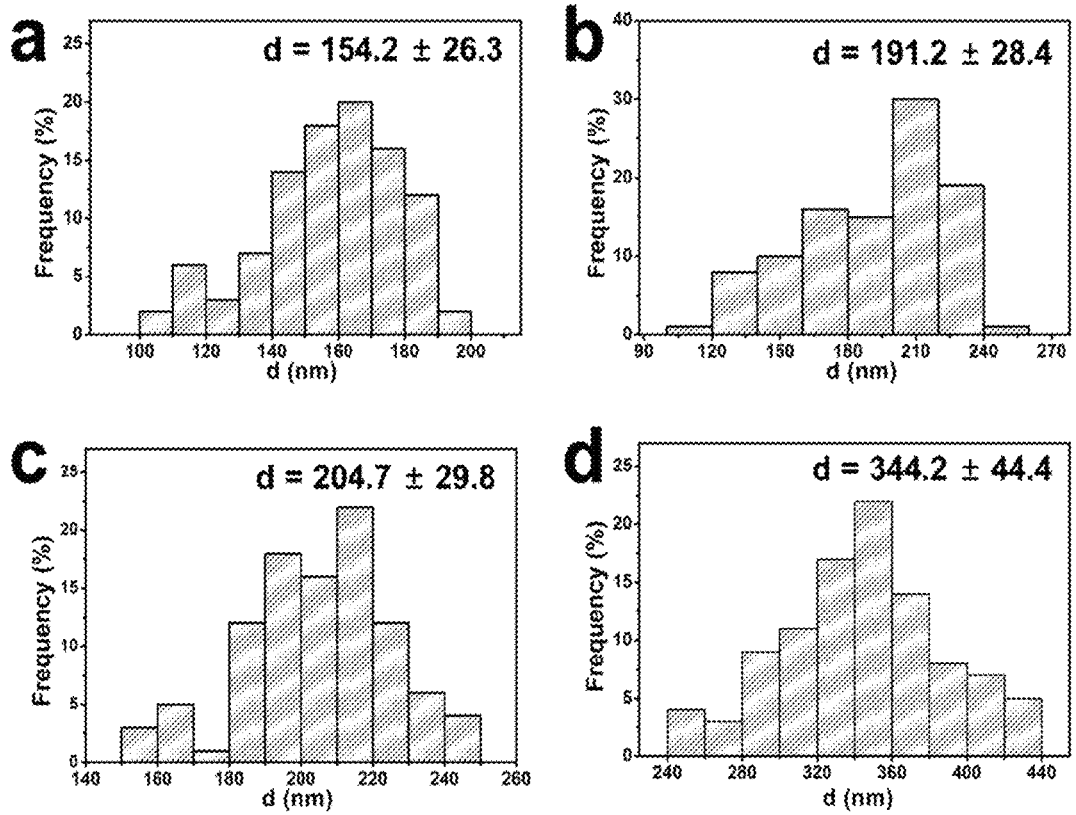

[FIG. 5]
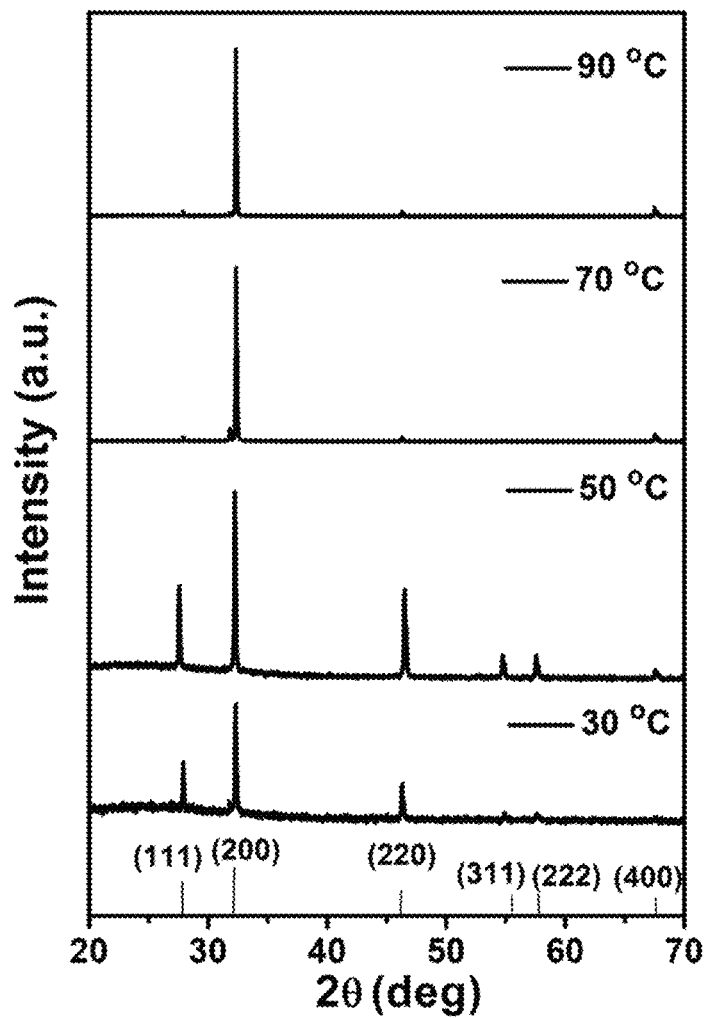

[FIGS. 6a-b]
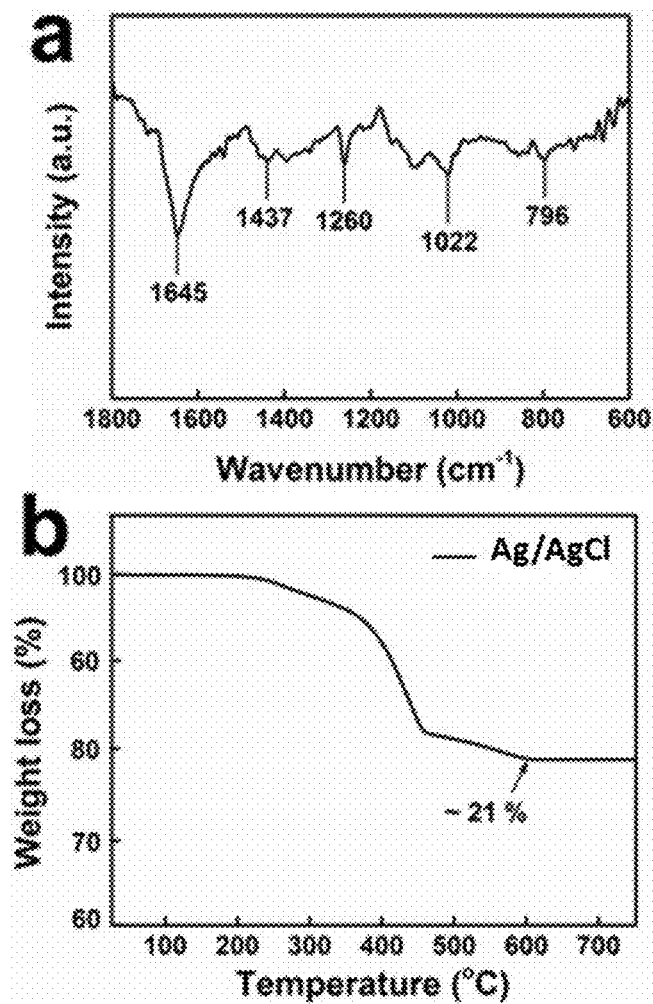

[FIG. 7]
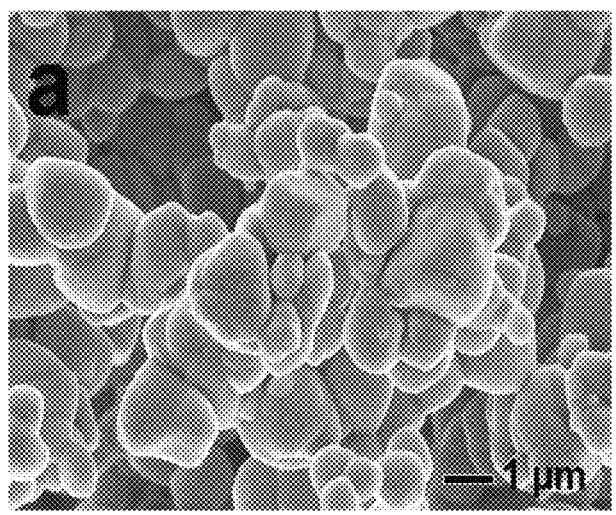
[FIG. 8]

[FIG. 9]
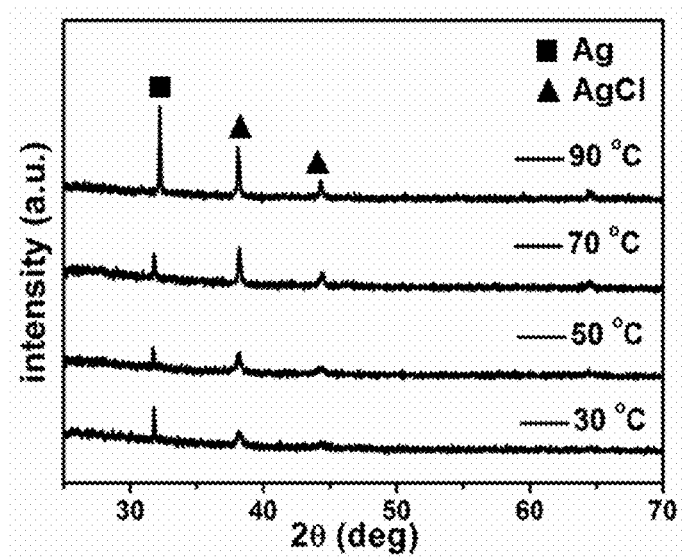
[FIGS.10a-j]
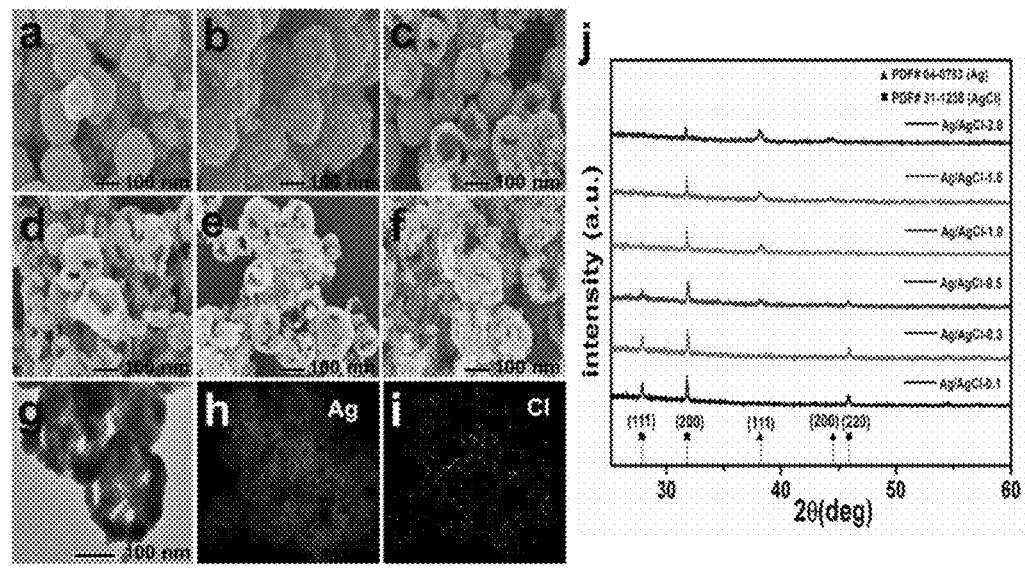

[FIG. 11]
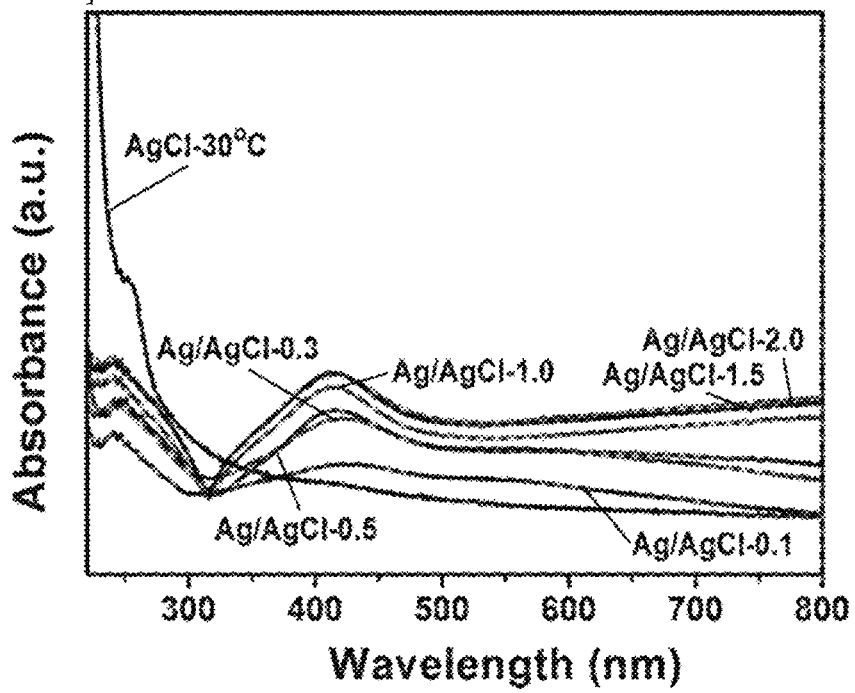
[FIGS. 12a-f]
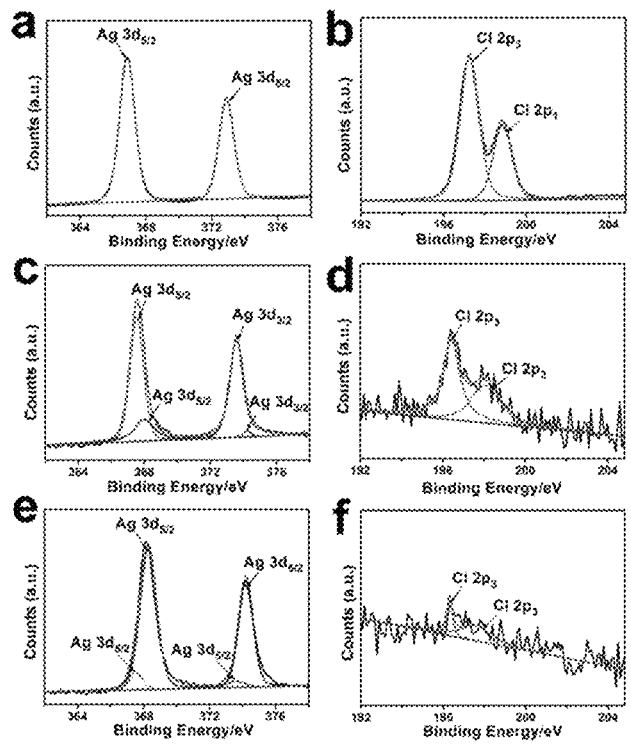

[FIGS. 13a-d]
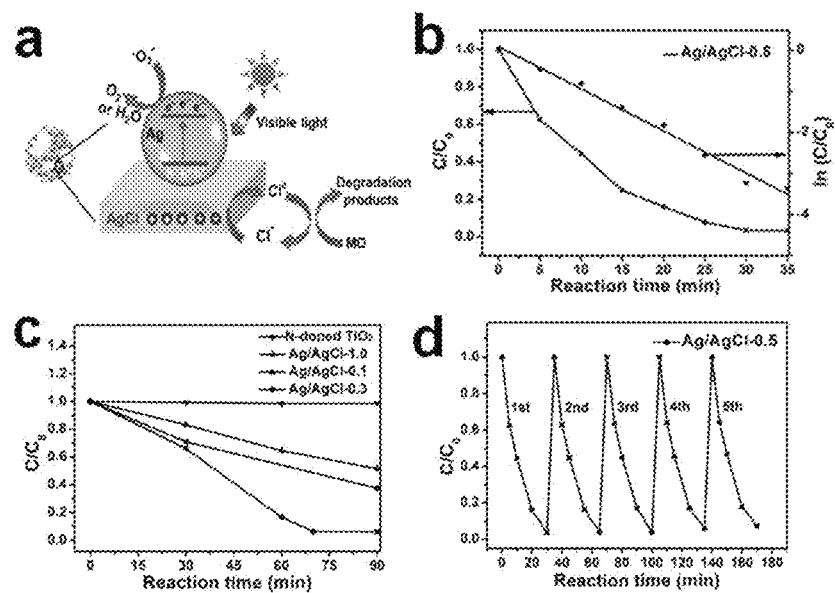
[FIG. 14]
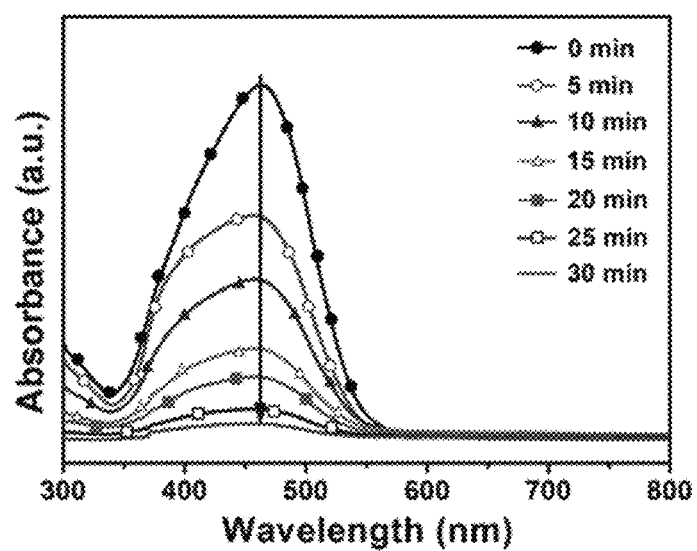

[FIG. 15]
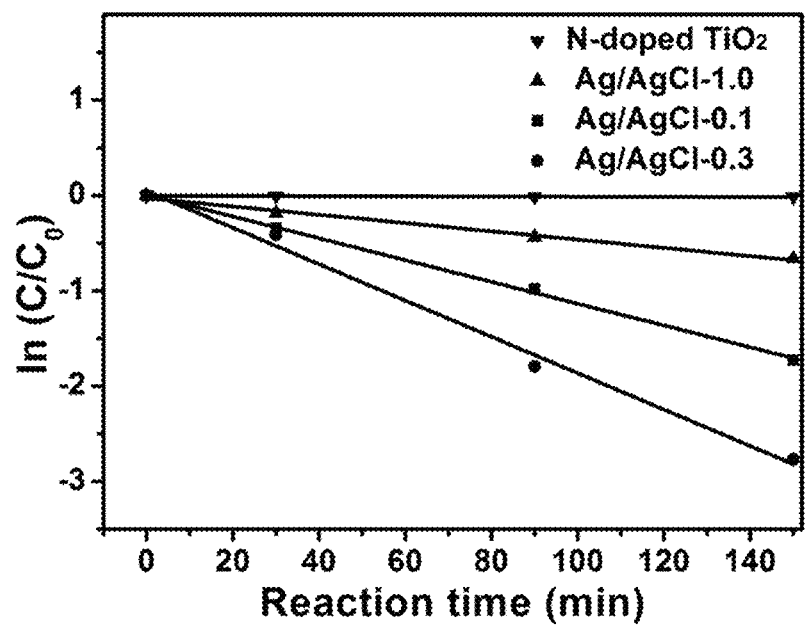
[FIGS. 16a-b]
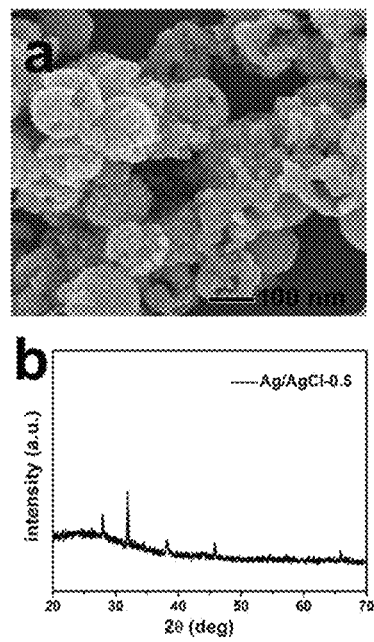

[FIG. 17]
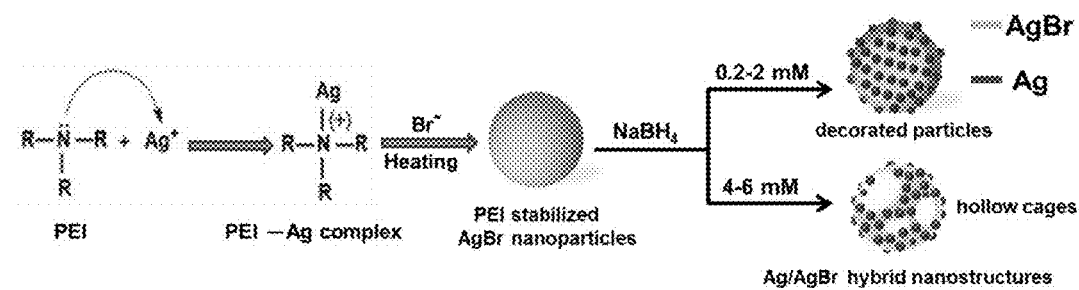
[FIGS. 18a-d]
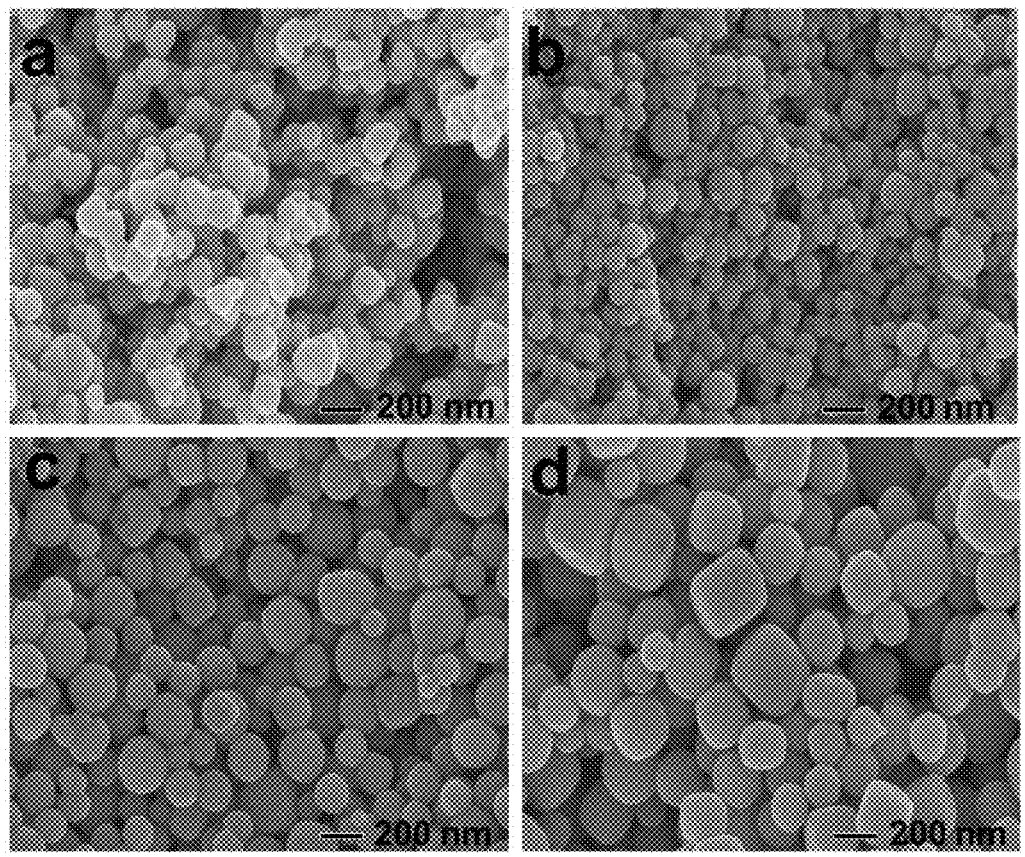

[FIGS. 19a-d]
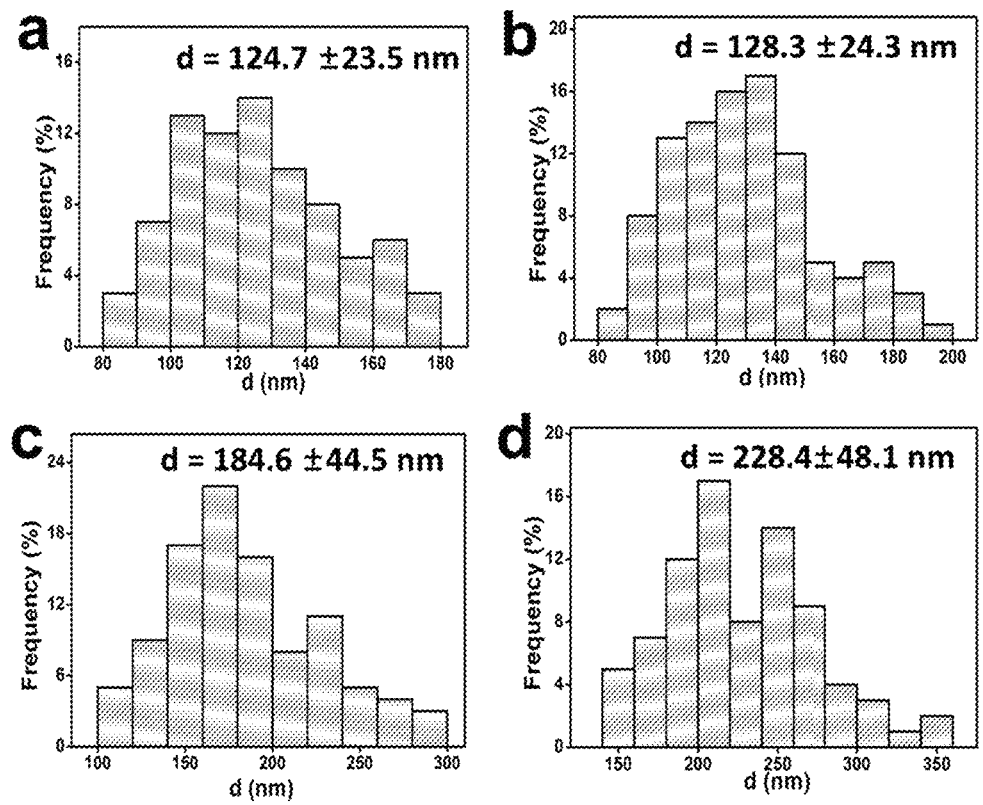
[FIG. 20]
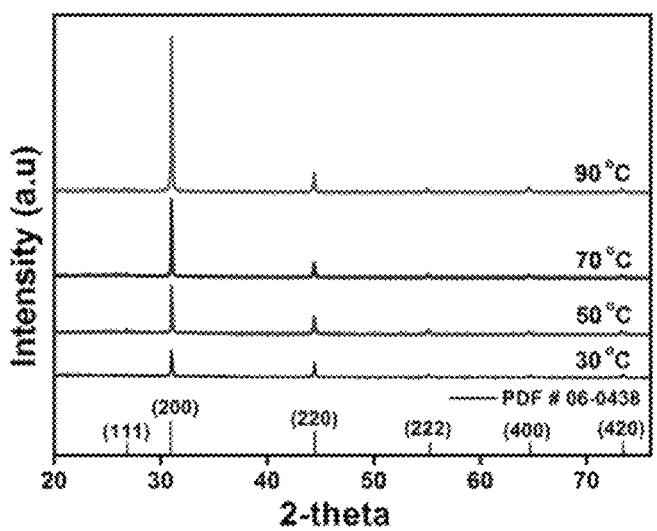

[FIGS. 21a-e]
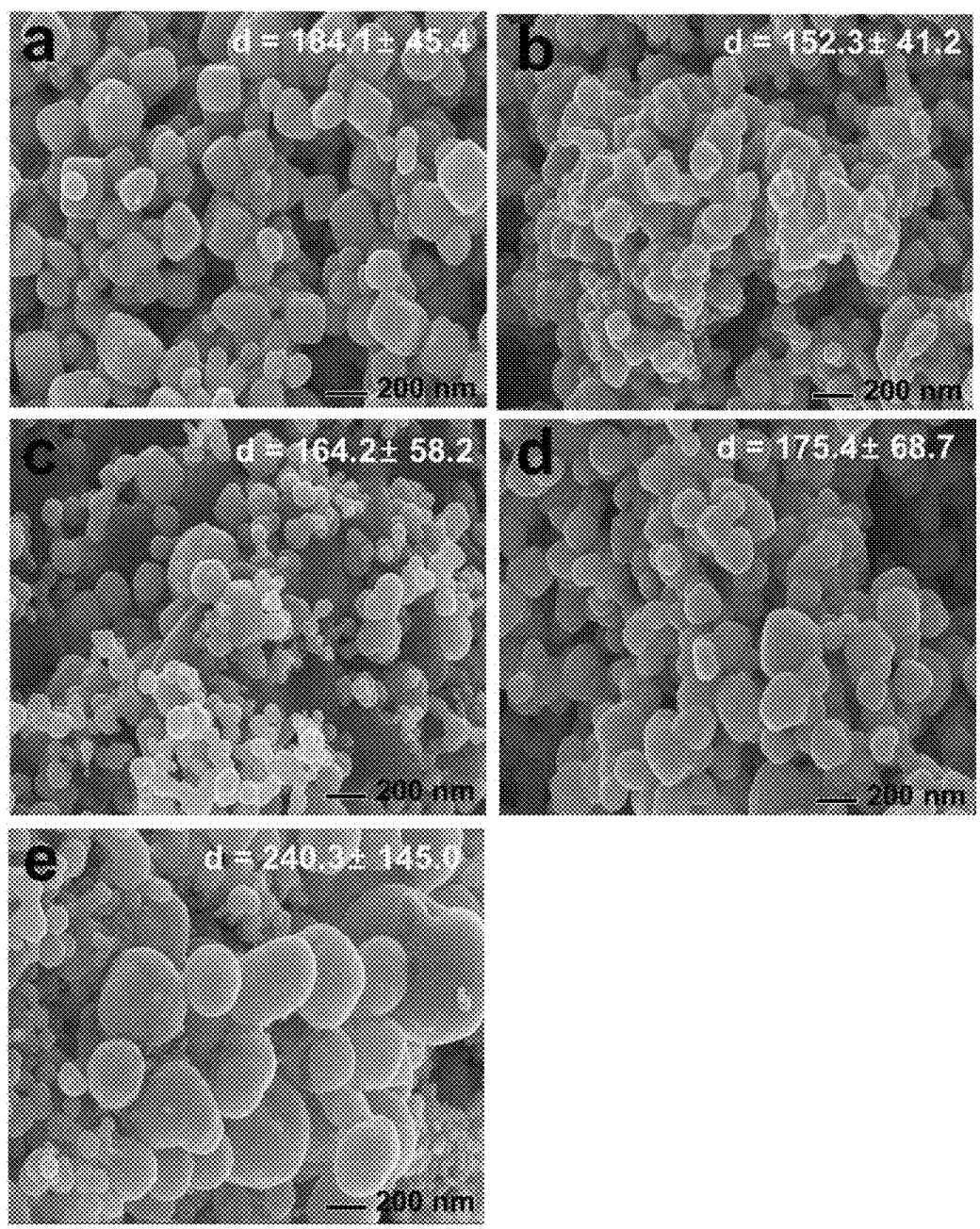

[FIG. 22]
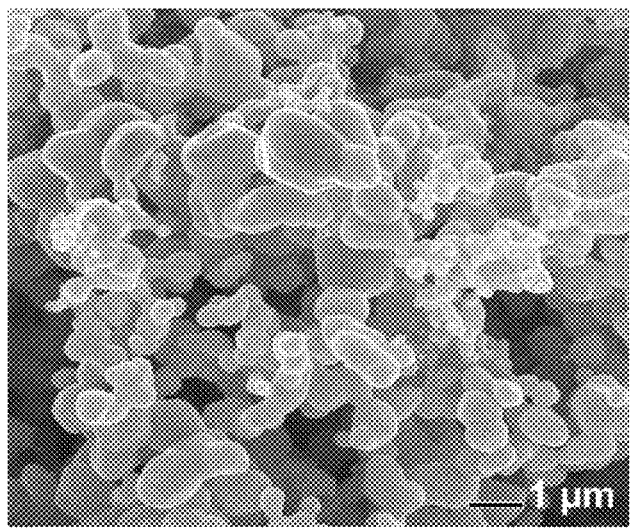
[FIGS. 23a-i]
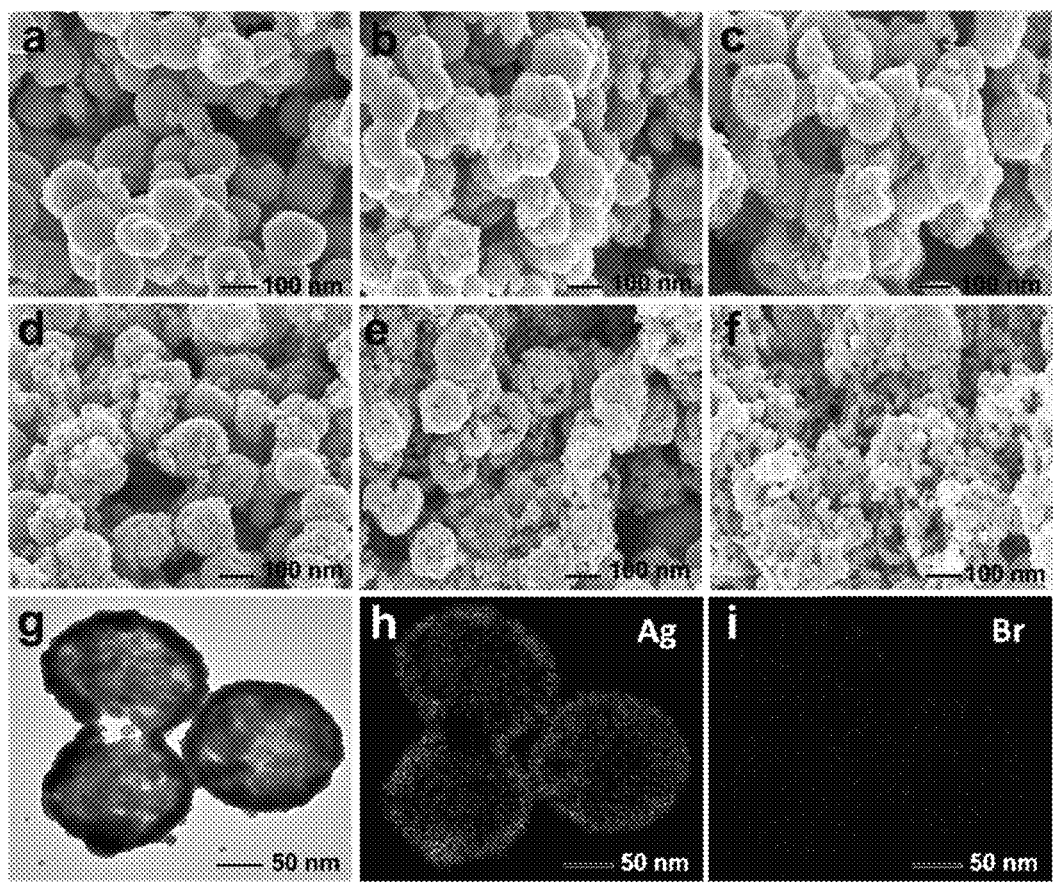

[FIGS. 24a-b]
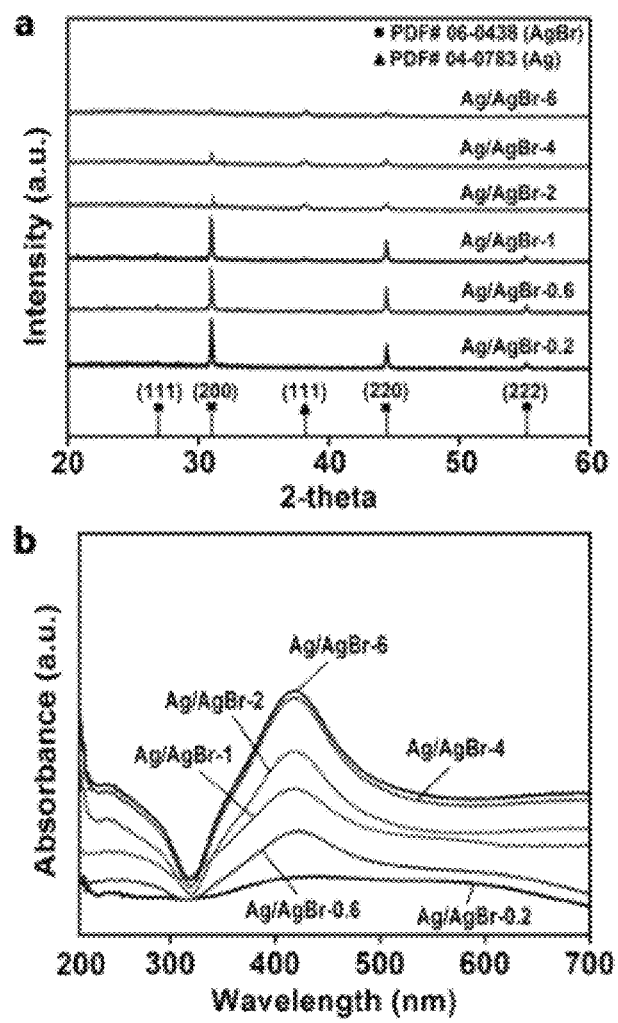

[FIG. 25]
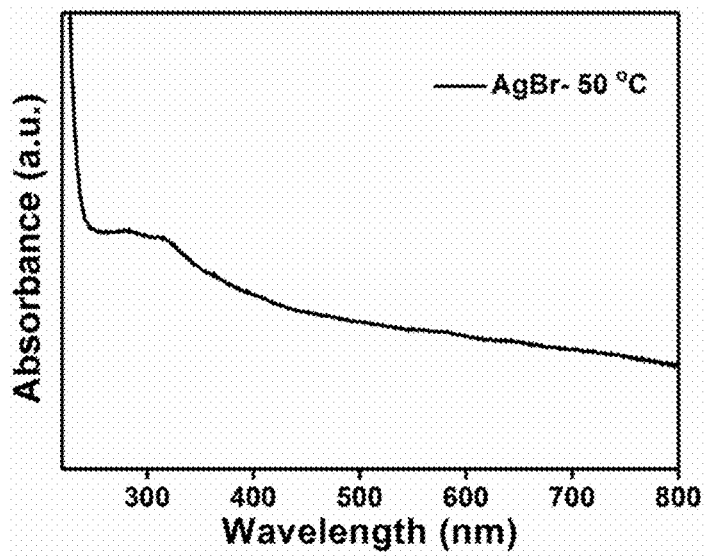
[FIGS. 26a-d]
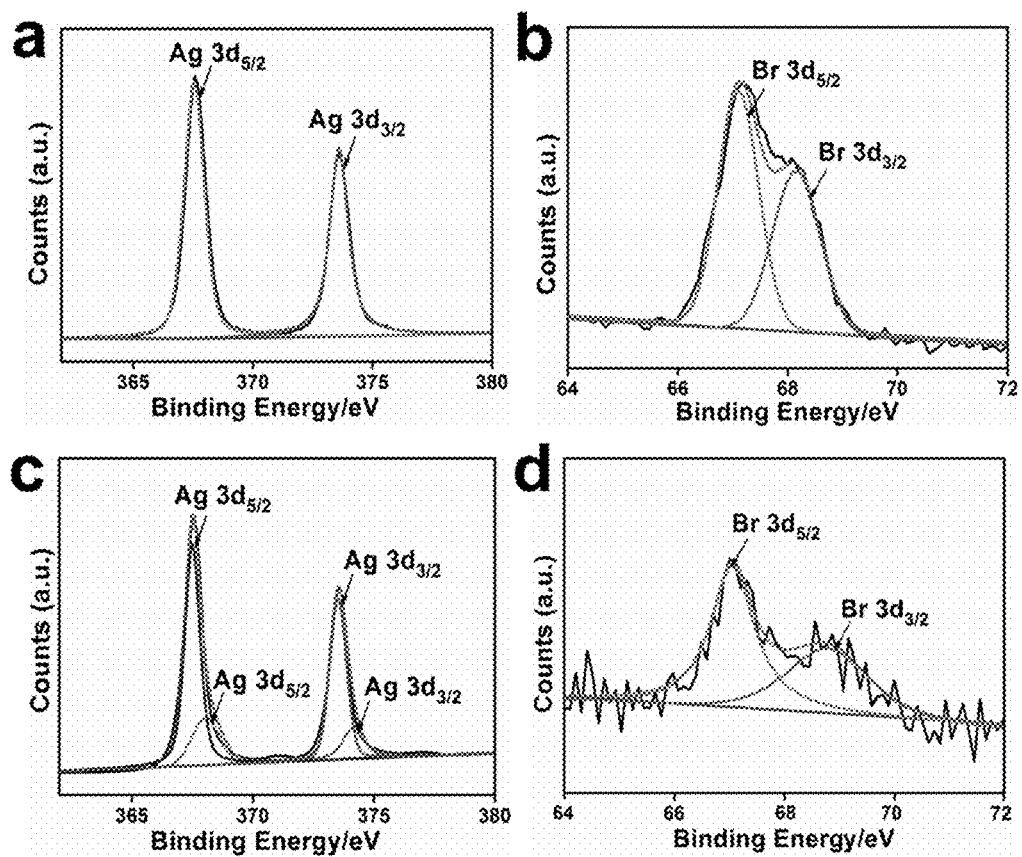

[FIG. 27]
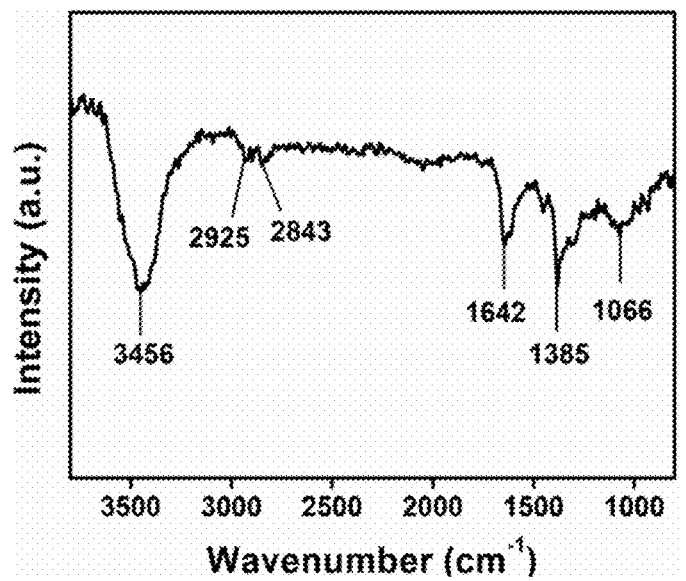
[FIG. 28]
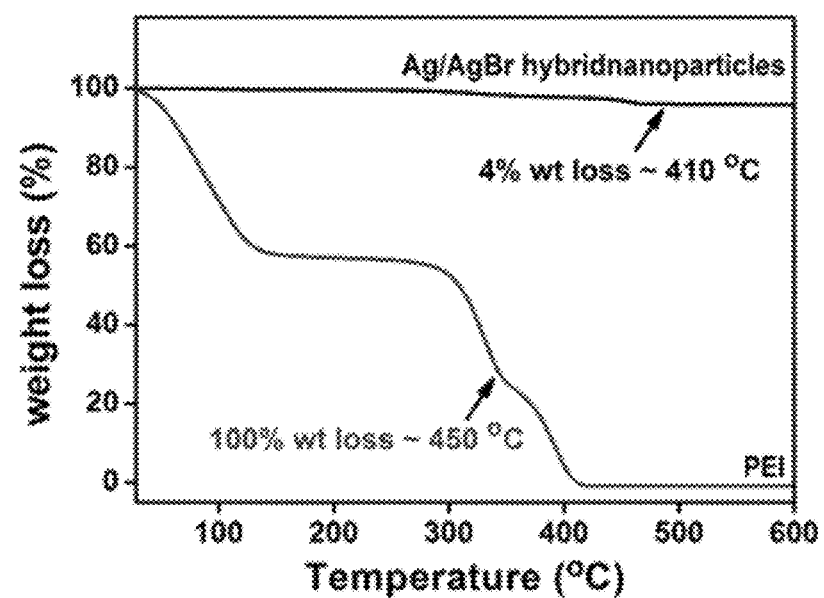

[FIGS. 29a-d]
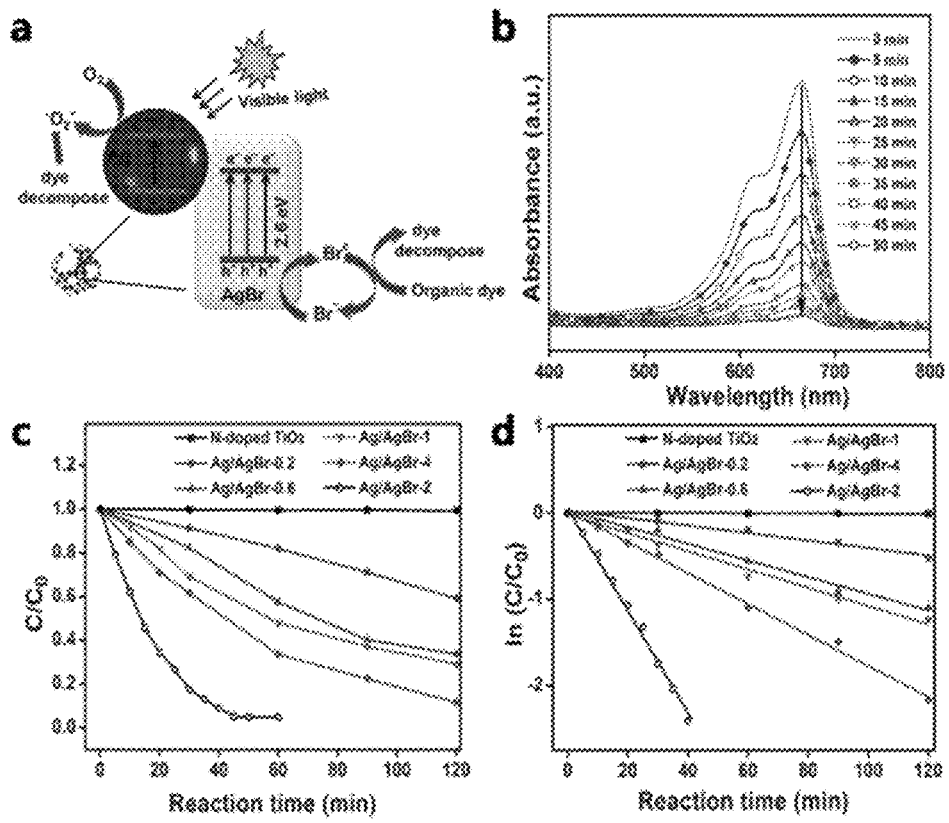
[FIG. 30]
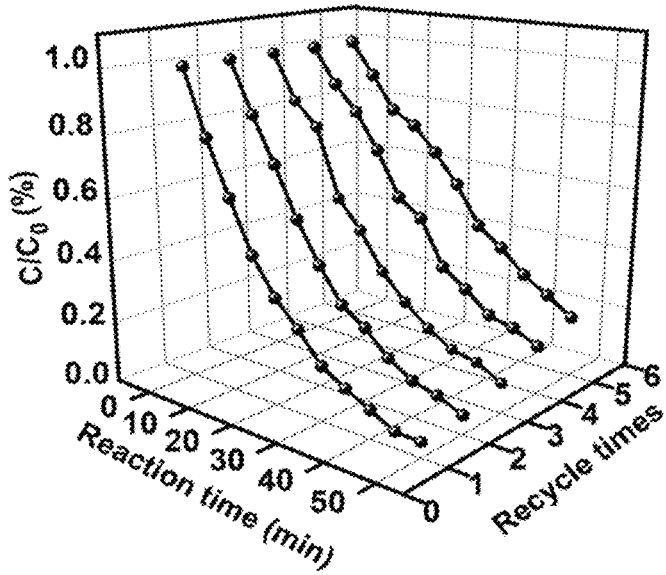

[FIGS. 31a-d]
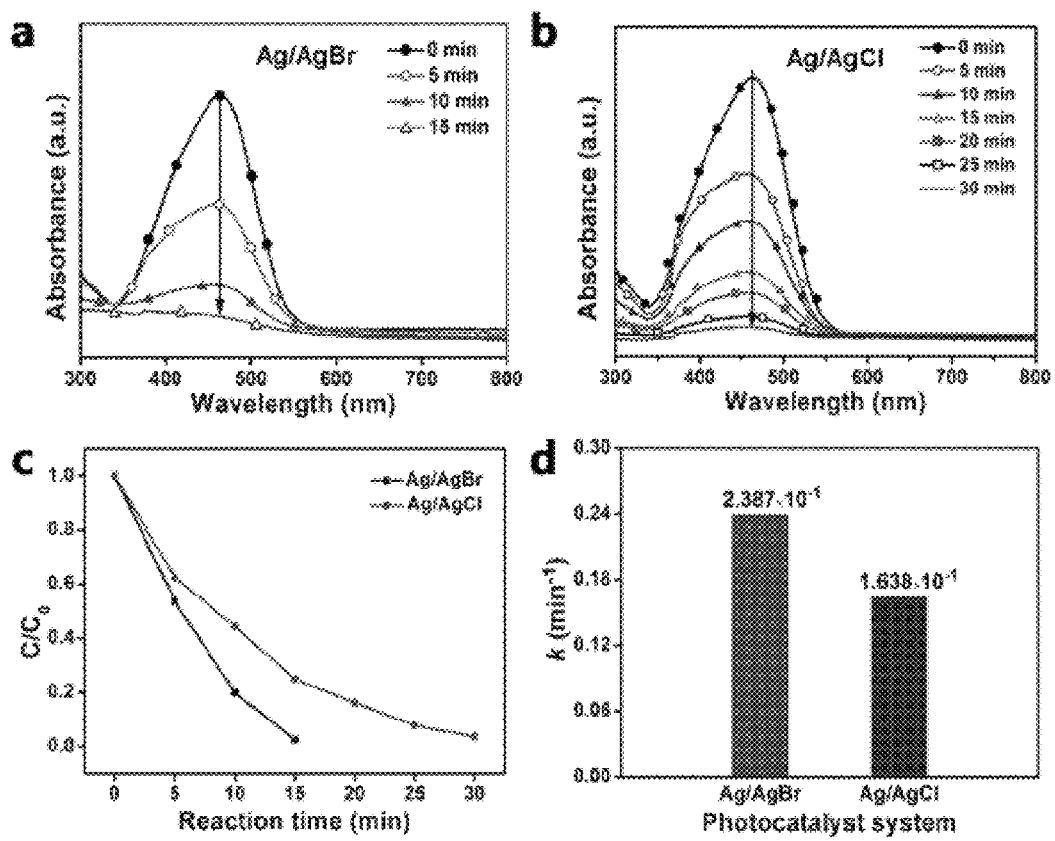
[FIG. 32a-b]
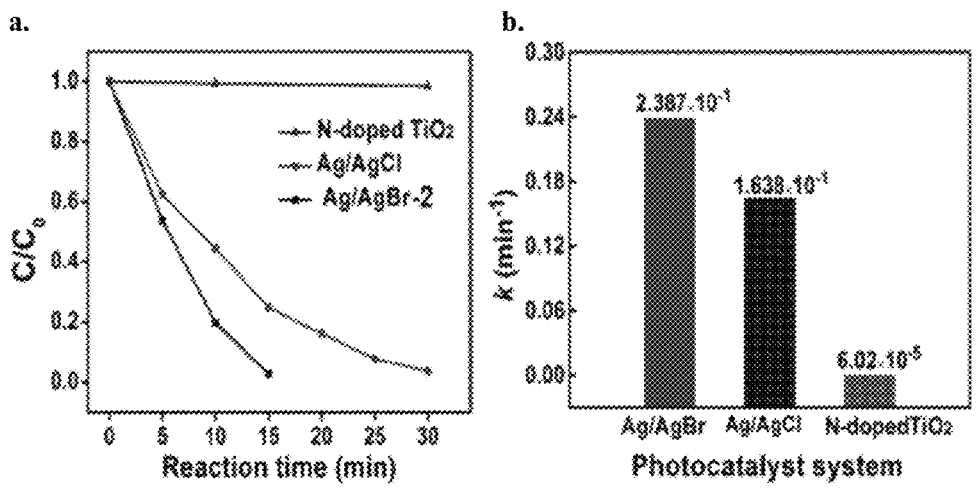

HYBRID NANOSTRUCTURED PHOTOCATALYSTS AND PREPARATION METHOD THEREOF

This application claims priority to Korean Application No. 10-2016-0085714, filed Jul 6, 2016, the entirety of which is specifically incorporated herein by reference.

TECHNICAL FIELD

The present invention relates to hybrid nanostructured photocatalysts. Specifically, the present invention relates to hybrid nanostructured photocatalysts using silver nanoparticles, and a preparation method thereof.

BACKGROUND ART

Noble metal nanostructures including gold, silver, and gold or silver alloy have been studied in various applications due to their plasmon resonance. The phenomenon of plasmon resonance has significant applications along with control over the nanostructures in terms of the size and morphology. Examples of such applications include colorimetric sensors, conversion to clean water by the decomposition of water using photocatalysts, conversion of carbon dioxide to hydrocarbon gases, and oxidation of organic contaminants. In photocatalysts, absorbing light and accelerating a photo-reaction are the most significant parts of photocatalysis. Additionally, a photocatalyst ideally has a high absorption rate of sunlight or visible light, and has high reactivity, non-toxicity, photostability, and chemical inactivity. Typically, a photocatalyst is a solid semiconductor having an ability to create electron-hole pairs when irradiated by light.

Plasmonic nanoparticles of noble metals with high absorption coefficients in the visible light region can serve as an alternative to sensitizers improving the absorption of a semiconductor, and they are mainly influenced by size and morphology. Additionally, the obtained hybrid catalysts have resistibility against degradation during the photoreaction. Various studies on noble metal/carrier hybrid photocatalysts have been reported. For example, the studies have been conducted on Ag/TiO$_2$/graphene, Au/TiO$_2$, and Ag/ZnO. On the other hand, Ag/AgCl has high activity and enhanced stability as a metal/semiconductor hybrid photocatalyst due to its fast separation and transportation of photogenerated electron-hole pairs. Multiple methods have been established in order to synthesize Ag/AgCl hybrid materials. Herein, such methods include an ion exchange reaction between Ag$^+$ and Cl$^-$ by UV or laser light, hydrothermal synthesis, and thermal decomposition in an ionic liquid, etc. However, most of these procedures are disadvantageous in that they require complicated reaction steps, long reaction times, high reaction temperatures, or have reduced control of the size and morphology of the Ag/AgCl structure due to a rapid reaction rate between the silver and chloride ions. Additionally, controlling the composition of Ag and AgCl in the hybrid material is the most challenging aspect not only to obtain a high absorbability of visible light but also to obtain a catalytic activity of Ag nanomaterials. Until these days, the maximum level of Ag in the Ag/AgCl hybrid structure has been limited to 80% in all previous reports.

Recently, TiO$_2$-based photocatalysts have been intensively investigated upon the discovery of the water electrolysis effect. TiO$_2$-based photocatalysts have a band gap that is wider than 3.2 eV. It enables TiO$_2$-based photocatalysts to be chemically stabilized, but, at the same time, restricts the response of TiO$_2$-based photocatalysts to the UV fraction of solar energy (about 4%) due to a low efficiency in visible and near infrared regions. In addition, the fast recombinant rate of photogenerated electron-hole pairs also decreases the catalytic efficiency of TiO$_2$-based photocatalysts. Over the past decades, considerable efforts have been devoted in order to improve their visible light absorption coefficient, including ion doping, noble metal deposition, anchoring organic dye molecules on the surface of photocatalysts, etc. Although there has been some progress enhancing photocatalytic efficiency in visible light, the limited amount and easy leaching of dopants may adversely influence the activity and chemical stability of photocatalysts. Additionally, dye molecules often may be self-degraded in dye-sensitized photocatalysts. On the other hand, some research groups have synthesized novel visible light catalysts, such as Bi$_2$WO$_6$, CFe$_2$O$_4$/TaON, and Cu$_2$(OH)PO$_4$, in addition to TiO$_2$-based photocatalysts. However, these photocatalysts still have some drawbacks such as low activity and poor stability, etc. Therefore, developing new efficient visible light photocatalysts with high activity, stability, and recyclability still remains as a significant challenge.

Meanwhile, over the past decades, considerable amounts of researches have been devoted to the rational design and construction of hybrid nanostructures in order to enhance photocatalytic performance by modulating the properties of individual constitutional elements. For example, heterostructures based on novel metal nanoparticles and semiconducting supporters have received great attention due to improved photocatalytic performances thereof which are derived from increased absorbance by an ability to create electron-hole pairs, and an effect of the surface plasmon (SPR).

In previous researches on the synthesis and photocatalytic applications of Ag/AgBr, researchers mainly devoted their attention towards Ag/AgCl hybrid structures. Although Ag/AgBr photocatalysts exhibit superior photocatalytic activity compared to Ag/AgCl, very few studies are available regarding the synthesis of well-defined Ag/AgBr nanostructures. In addition, the reported procedures typically require tedious reaction steps, high reaction temperatures, non-aqueous solvents, and low reagent concentrations. Wang et al. prepared a Ag/AgBr plasmonic photocatalyst using Ag$_2$MoO$_4$ (Highly Efficient Visible-Light Plasmonic Photocatalyst Ag@AgBr. *Chem. Eur. J.* 2009, 15, 1821-1824). However, the synthesis was conducted under high pressure and temperature (over 180° C.), and required at least a reaction time of 8 hours or more. Further, the obtained hybrid particles were agglomerated, and the size thereof was greater than 1 μm. Xiao et al. synthesized Ag/AgBr cubic cages in a non-aqueous phase using a sacrificial template process by reacting for 24 hours with silver precursors at a low concentration of 1 mM. (Cubic Cages with Efficient Visible-Light-Induced Photocatalytic Activity. *Appl. Catal. B Environ.* 2015, 163, 564-572). Kuai et al. prepared microsized Ag/AgBr in an aqueous phase by reacting with AgNO$_3$ in the presence of hexadecyl trimethylammonium bromide (CTAB) and ammonia for 8 hours at 120° C. in an autoclave (Facile Subsequently Light-Induced Route to Highly Efficient and Stable Sunlight-Driven Ag—AgBr Plasmonic Photocatalyst. *Langmuir.* 2010, 26, 18723-18727).

DISCLOSURE

Technical Problem

One embodiment of the present invention is to provide a hybrid nanostructured photocatalyst using PEI, and a preparation method thereof.

Another embodiment of the present invention is to provide a hybrid nanostructured photocatalyst which is dispersed as a solid state in an aqueous solution.

Further, another embodiment of the present invention is to provide a hybrid nanostructured photocatalyst in which the shape and the size thereof are controlled by controlling the reaction temperature when preparing the photocatalyst.

Still further, another embodiment of the present invention is to provide a hybrid nanostructured photocatalyst in which the ratio of a first nanoparticle to a second nanoparticle is controlled by controlling the amount of a reducing agent.

Technical Solution

A first aspect of the present invention is to provide a hybrid nanostructured photocatalyst, comprising: a first nanoparticle comprising silver halide (AgX), wherein X is any of Cl, Br, and I; a second nanoparticle, which is formed on an outer surface of the first nanoparticle and comprises Ag; and a polymer formed on any one outer surface of the first nanoparticle and the second nanoparticle.

Preferably, the first nanoparticle may have at least one shape selected from the group consisting of a semi-sphere, a sphere, a truncated-cube, and a cube.

Preferably, the second nanoparticle may be formed on the outer surface of the first nanoparticle, and the shape of the hybrid nanostructured photocatalyst may be formed to correspond to the shape of the first nanoparticle.

Preferably, at least a part of the first nanoparticle and the second nanoparticle may have a crystal structure.

Preferably, at least a part of the first nanoparticle and the second nanoparticle may have a face-centered cubic structure.

Preferably, the hybrid nanostructured photocatalyst may have band gap energy of 2.0 eV to 3.0 eV and photocatalytic activity in a visible light region.

Preferably, the first nanoparticle is composed of one and the second nanoparticle may be composed of a multiplicity, wherein multiple second nanoparticles may be are formed on the outer surface of the first nanoparticle in a dendritic form.

Preferably, the first nanoparticle may have a size of 100 nm to 400 nm.

Preferably, the second nanoparticle may have a size of 5 nm to 25 nm.

Preferably, the polymer may be at least one selected from the group consisting of polyethyleneimine (PEI), polyvinylpyrrolidone (PVP), polyethylene glycol (PEG), and polyvinyl alcohol (PVA).

Preferably, the weight ratio between the first nanoparticle and the second nanoparticle may be in a range of 1:0.03 to 1:0.76.

A second aspect of the present invention is to provide a method for preparing the hybrid nanostructured photocatalyst according to above first aspect comprising: 1) preparing an aqueous solution containing a silver precursor; 2) preparing a first nanoparticle by introducing a polymer and an electrolyte salt into the aqueous solution containing the silver precursor; and 3) forming a second nanoparticle on an outer surface of the first nanoparticle by mixing with a reducing agent in step 2.

Preferably, step 2 may further comprise controlling the shape of the first nanoparticle by heating, wherein the shape of the first nanoparticle may be at least one selected from the group consisting of a semi-sphere, a sphere, a truncated-cube, and a cube.

Preferably, the silver precursor may be at least one selected from the group consisting of $AgBF_4$, $AgCF_3SO_3$, $AgClO_4$, $AgNO_3$, $AgPF_6$, and $Ag(CF_3COO)$.

Preferably, the silver precursor in the aqueous solution may have a concentration of 0.01 M to 3.0 M.

Preferably, the polymer may be at least one selected from the group consisting of polyethyleneimine (PEI), polyvinylpyrrolidone (PVP), polyethylene glycol (PEG), and polyvinyl alcohol (PVA).

Preferably, the reducing agent may be at least one selected from the group consisting of ascorbic acid, sodium hydroxide (NaOH), potassium hydroxide (KOH), hydrazine ($N_2H_4$), sodium hydrophosphate ($NaH_2PO_4$), glucose, tannic acid, dimethyl formamide ($C_3H_7NO$), tetrabutylammonium borohydride, sodium borohydride ($NaBH_4$), calcium hydride ($CaH_2$), sodium hydride (NaH), lithium hydride (LiH), and lithium borohydride ($LiBH_4$).

Preferably, the reducing agent in the aqueous solution may be added in a concentration of 0.1 mM to 15 mM.

Preferably, step 2 may be conducted at between room temperature and 100° C.

Advantageous Effects

As described above, according to the present invention, it is possible to provide a hybrid nanostructured photocatalyst using PEI, and a preparation method thereof.

Additionally, according to the present invention, it is possible to provide a hybrid nanostructured photocatalyst dispersed in a solid condition in an aqueous solution.

Additionally, according to the present invention, it is possible to provide a hybrid nanostructured photocatalyst in which the shape and size are controlled by controlling the photocatalytic reaction temperature.

Additionally, according to the present invention, it is possible to provide a hybrid nanostructured photocatalyst in which the ratio of a first nanoparticle to a second nanoparticle is controlled by controlling the amount of a reducing agent.

BRIEF DESCRIPTIONS OF THE DRAWINGS

FIGS. 1a-h show SEM and HRSEM images of AgCl nanoparticles prepared by reacting NaCl with $AgNO_3$ in the presence of polyethyleneimine (PEI) at different reaction temperatures; a) 30° C., b) 50° C., c) 70° C., and d) 90° C. Additionally, FIGS. 1e to 1h show SEM images of Ag/AgCl hybrid nanostructures synthesized by reacting AgCl nanoparticles (shown in FIGS. 1a to 1d, respectively) with 2.0 mL of $NaBH_4$ (10 mM).

FIG. 2 shows optical images of aqueous suspensions of the AgCl nanoparticles prepared at the different temperatures shown in FIGS. 1a to 1d.

FIG. 3 shows absorption spectra of the AgCl nanoparticles shown in FIGS. 1a to 1d.

FIGS. 4a-d show distribution diagrams of each particle size of the AgCl nanoparticles shown in FIGS. 1a to 1d. FIG. 4a corresponds to 30° C., FIG. 4b corresponds to 50° C., FIG. 4c corresponds to 70° C., and FIG. 4d corresponds to 90° C., respectively.

FIG. 5 shows XRD patterns of the AgCl nanoparticles shown in FIGS. 1a to 1d.

FIGS. 6a-b. FIG. 6a shows an FT-IR spectrum of the AgCl nanoparticles synthesized at 30° C. shown in FIG. 1a, and FIG. 6b shows a graph of TGA thermal analysis thereof.

FIG. 7 shows an SEM image of the AgCl nanoparticles prepared under the same condition of FIG. 1a, except that the experiment was conducted in the absence of polyethyleneimine (PEI).

FIG. 8 shows a schematic diagram of reaction pathways for the synthesis of the Ag/AgCl hybrid nanostructures.

FIG. 9 shows XRD patterns of the Ag/AgCl hybrid nanostructures prepared by reacting each of AgCl nanoparticles (FIGS. 1a to 1d, respectively) with 2.0 mL of NaBH$_4$ (10 mM).

FIGS. 10a-j. FIGS. 10a to 10f show SEM images of the Ag/AgCl hybrid nanostructures synthesized by reacting the AgCl semi-spheres shown in FIG. 1a with different volumes of NaBH$_4$ (10 mM); a) 0.1 mL (Ag/AgCl-0.1), b) 0.3 mL (Ag/AgCl-0.3), c) 0.5 mL (Ag/AgCl-0.5), d) 1.0 mL (Ag/AgCl-1.0), e) 1.5 mL (Ag/AgCl-1.5), and f) 2.0 mL (Ag/AgCl-2.0). FIG. 10g shows a TEM image of the Ag/AgCl-2.0 shown in FIG. 10f. In addition, FIGS. 10h and 10i show EDX elemental mapping analysis data of the Ag/AgCl-2.0 shown in FIG. 10f. FIG. 10j shows powder XRD patterns of the Ag/AgCl hybrid nanostructures shown in FIGS. 10a to 10f.

FIG. 11 shows UV-vis absorption spectra of the AgCl semi-spheres and the Ag/AgCl hybrid nanostructures shown in FIGS. 10a to 10f.

FIGS. 12a-f FIGS. 12a and 12b show XPS spectra of the AgCl nanoparticles shown in FIG. 1b, FIGS. 12c and 12d show XPS spectra of the Ag/AgCl-0.5 shown in FIG. 10c, and FIGS. 12e and 12f show XPS spectra of the Ag/AgCl-2.0 shown in FIG. 10f.

FIGS. 13a-d. FIG. 13a shows a schematic diagram of the proposed degradation mechanism of MO using Ag/AgCl plasmonic photocatalysts, and FIGS. 13b and 13c show photocatalytic degradation graphs of MO using the Ag/AgCl hybrid nanostructures. FIG. 13b shows normalized concentrations of MO as a function of reaction time on both linear and logarithmic scales, FIG. 13c shows the normalized concentrations of MO for different photocatalysts on a logarithmic scale, and FIG. 13d shows photodegradation kinetics of MO for five consecutive cycles with the same batch of Ag/AgCl-0.5.

FIG. 14 shows UV-vis absorption spectra for photocatalytic degradation of MO molecules using Ag/AgCl-0.5 under visible light irradiation.

FIG. 15 shows $\ln(C/C_0)$ kinetic plots on reaction times for MO degradation using different photocatalysts.

FIGS. 16a-b. FIG. 16a shows a SEM image of Ag/AgCl-0.5 catalysts upon five consecutive photocatalytic reactions, and FIG. 16b shows an XRD pattern thereof.

FIG. 17 shows a schematic diagram of reaction pathways for synthesizing Ag/AgBr hybrid nanostructures.

FIGS. 18a to 18d show SEM images of AgBr nanoparticles prepared by reacting NaBr with AgNO$_3$ (0.5 M) in the presence of PEI at different reaction temperatures; a) 30° C., b) 50° C., c) 70° C., and d) 90° C.

FIGS. 19a-d show distribution diagrams of the particle size of the AgBr nanoparticles synthesized at different temperatures shown in FIGS. 18a to 18d, wherein the temperatures are a) 30° C., b) 50° C., c) 70° C., and d) 90° C.

FIG. 20 shows XRD patterns of the AgBr nanoparticles synthesized at different reaction temperatures shown in FIGS. 18a to 18d.

FIGS. 21a to 21e show SEM images of the AgBr nanoparticles prepared under the same condition shown in FIG. 18b, except that the experiment was conducted with different AgNO$_3$ concentrations, wherein the AgNO$_3$ concentrations are a) 0.1 M, b) 1.0 M, c) 1.5 M, d) 2.0 M, and e) 2.5 M.

FIG. 22 shows a SEM image of the AgBr nanoparticles prepared under the same condition shown in FIG. 18b, except that the experiment was conducted in the absence of PEI.

FIGS. 23a-i. FIGS. 23a to 23f show SEM images of the Ag/AgBr hybrid nanostructures prepared by reacting the AgBr nanoparticles shown in FIG. 18b with NaBH$_4$ (1 mL) of different concentrations; a) 0.2 mM (Ag/AgBr-0.2), b) 0.6 mM (Ag/AgBr-0.6), c) 1.0 mM (Ag/AgBr-1), d) 2.0 mM (Ag/AgBr-2), e) 4.0 mM (Ag/AgBr-4), and f) 6.0 mM (Ag/AgBr-6). FIG. 23g shows a TEM image of the Ag/AgBr-6 shown in FIG. 23f, and FIGS. 23h and 23i show EDX elemental mapping analysis data of Ag/AgBr-6 shown in FIG. 23f.

FIGS. 24a-b. FIG. 24a shows powder XRD patterns of the Ag/AgBr hybrid nanostructures shown in FIGS. 23a to 23f, and FIG. 24b shows UV-vis absorption spectra of the Ag/AgBr hybrid nanostructures shown in FIGS. 23a to 23f.

FIG. 25 shows a UV-vis absorption spectrum of the AgBr nanoparticles prepared at 50° C. shown in FIG. 18b.

FIGS. 26a-d. FIGS. 26a and 26b show XPS spectra of the AgBr nanoparticles shown in FIG. 18b. FIGS. 26c and 26d show XPS spectra of the Ag/AgBr-6 hybrid nanostructures shown in FIG. 23f.

FIG. 27 shows a FT-IR spectrum of the Ag/AgBr hybrid nanostructures shown in FIG. 23f.

FIG. 28 shows a graph of TGA thermal analysis of the Ag/AgBr hybrid nanostructures shown in FIG. 23f.

FIGS. 29a-d. FIG. 29a shows a schematic diagram of the proposed degradation mechanism of MB using Ag/AgBr photocatalysts, FIG. 29b shows UV-vis absorption spectra for photocatalytic degradation of MB molecules using Ag/AgBr-2 under visible light irradiation, and FIGS. 29c and 29d show graphs for photocatalytic degradation of MB using Ag/AgBr hybrid nanostructures. FIG. 29c shows the normalized concentrations of MB for different photocatalysts on a linear scale, and FIG. 29d shows the normalized concentrations of MB for different photocatalysts on a logarithmic scale.

FIG. 30 shows photodegradation kinetics of MB for five consecutive cycles with the same batch of Ag/AgBr-2.

FIGS. 31a-d. FIGS. 31a and 31b show UV-vis absorption spectra for photocatalytic degradation of MO molecules using different photocatalysts; a) Ag/AgBr-2 and b) Ag/AgCl hybrid nanostructures. FIG. 31c shows the normalized concentrations of the MO for Ag/AgBr and Ag/AgCl photocatalysts on a linear scale. FIG. 31d shows the rate constant (k) exhibiting the catalytic activity of the Ag/AgBr and Ag/AgCl photocatalysts towards MO degradation.

FIGS. 32a-b. FIG. 32a shows $\ln(C/C_0)$ kinetic plots according to reaction times for MB degradation of N-doped TiO$_2$, Ag/AgCl, and Ag/AgBr-2 photocatalysts. FIG. 32b shows the rate constant (k) for MB degradation of N-doped TiO$_2$, Ag/AgCl, and Ag/AgBr-2 photocatalysts.

DETAILED DESCRIPTION OF THE INVENTION

A first aspect of the present invention relates to a hybrid nanostructured photocatalyst, comprising: a first nanoparticle comprising silver halide (AgX), wherein X is any of Cl, Br, and I; a second nanoparticle, which is formed on an outer surface of the first nanoparticle and comprises Ag; and a polymer formed on any one outer surface of the first nanoparticle and the second nanoparticle.

Additionally, a second aspect of the present invention relates to a method for preparing the hybrid nanostructured photocatalyst according to above first aspect and may comprise the following steps: 1) preparing an aqueous solution containing a silver precursor; 2) preparing a first nanoparticle by introducing a polymer and an electrolyte salt into the aqueous solution containing the silver precursor; and 3) forming a second nanoparticle on an outer surface of the first nanoparticle by mixing with a reducing agent in step 2.

The nanostructured photocatalysts and the preparation method thereof according to an exemplary embodiment of the present invention relates to a AgX (e.g., AgCl, AgBr, etc.) nanoparticle (a first nanoparticle) whose shape is controlled and the preparation method thereof. Therefore, by a fast and economic aqueous-phase route, the hybrid nanostructured photocatalysts can be prepared as efficient and stable visible light photocatalysts. The hybrid nanostructures whose shape is controlled according to an exemplary embodiment can be synthesized by reducing the first nanoparticle prepared by reacting silver ions with halogen ions in an aqueous phase with the presence of polymers. The synthesized nanostructured photocatalysts may comprise the first and second nanoparticles. For example, the Ag/AgCl hybrid nanostructure synthesized by reducing the AgCl nanoparticles prepared by reacting $Cl^-$ with $Ag^+$ in the presence of PEI as a polymer has a hybrid structure in which the second nanoparticles having a size of 5 nm to 25 nm are decorated on the surface of the first nanoparticles having a size of 150 nm to 350 nm. For example, the first nanoparticle may be a particle with a box or a cage shape, or may have a hollow structure. Additionally, the second nanoparticle may be decorated on the surface of the first nanoparticle so that the shape of the first nanoparticle can be maintained.

The preparation method of the hybrid nanostructured photocatalyst according to an exemplary embodiment of the present invention may easily control the shape and composition of the nanoparticles by varying the experimental conditions, including the reaction temperature and the amount of a reducing agent. For example, according to an exemplary embodiment of the present invention, a Ag/AgX hybrid nanostructure, such as Ag/AgCl or Ag/AgBr, can be prepared within 5 minutes of reaction time, and the Ag level in the Ag/AgX hybrid nanostructure can be controlled to 97.4%. The Ag/AgX hybrid nanostructures in a synthesized form may exhibit enhanced photocatalytic activity and stability during the degradation of methyl orange under visible light irradiation due to their strong surface plasmon resonance (SPR) effect.

Hereinbelow, the present invention will be described in detail.

First, the photocatalysts according to the present invention may be composed of Ag/AgX hybrid nanostructures. In the Ag/AgX hybrid nanostructure photocatalysts, when a reducing agent is added to a AgX nanoparticle which is the first nanoparticle, a part of the AgX may be reduced to form a Ag nanoparticle, which is the second nanoparticle. The second nanoparticle may be formed in a smaller size compared to the first nanoparticle, and may be decorated on the surface of the first nanoparticle.

For example, the X may be any of Cl, Br, and I.

The electrolyte salt may be $NaClO_4$, $NaBF_4$, $NaAlCl_4$, $NaSbF_6$, $NaPF_6$, $NaSCN$, $NaCF_3SO_3$, $NaCF_3CO_2$, $NaAsF_6$, NaF, NaCl, NaBr, NaI, $MnCl_2$, $CaCl_2$, KCl, NaI, LiCl, RbCl, CsCl, HCl, 1-butyl-3-methylimidazolium chloride ($C_4MIMCl$), 1-octyl-3-methylimidazolium chloride ($C_8MIMCl$), or 1-dodecyl-3-methylimidazolium chloride ($C_{12}MIMCl$).

The first nanoparticle may be prepared via a precipitation reaction of precursors and electrolyte salts.

The shape of the first nanoparticle may be at least one selected from the group consisting of a semi-sphere, a sphere, a truncated-cube and a cube. The truncated-cube may be in the shape of a cube with carved edges. The shape of the first nanoparticle may be controlled by reaction temperatures. For example, AgCl nanoparticles exhibit the shape of a semi-sphere at 30° C., a sphere at 50° C., a truncated cube at 70° C., and a semi-sphere at 90° C. As a result, it can be known that the shape of the AgCl nanoparticles changes from a globular shape to a polyhedral shape as the reaction temperature increases. In another non-limiting example of the present invention, in the case of AgBr nanoparticles, a phenomenon similar to AgCl occurs, but the crystallinity of the AgBr may be lower than that of the AgCl. Specifically, the AgBr nanoparticles have a tendency to exhibit a semi-spherical shape at 30° C., and change their shape to a cube shape as the reaction temperature increases.

When the reaction temperature is low, the size of the produced nanoparticles is not even, and the preparation efficiency may be reduced, whereas the size thereof becomes even and a reaction rate becomes fast as the reaction temperature increases. However, there is no great difference in the improvement above a certain temperature. Considering these properties of the reaction temperature, 30° C. to 90° C. of the reaction temperature would be preferable, but is not limited thereto as long as the reaction temperature remains below 100° C. Additionally, an average size of the AgX nanoparticles is gradually increased as the reaction temperature increases.

A size of the first nanoparticle may be 100 nm to 400 nm. The first nanoparticle having a size below 100 nm tends to have reduced photocatalytic efficiency due to its small size. In addition, the first nanoparticle having a size greater than 400 nm also may have reduced photocatalytic efficiency due to aggregation between the first nanoparticles, and may have reduced efficiency due to its reduced surface area. The size of the first nanoparticle may preferably be 110 nm to 370 nm.

The second nanoparticles are formed on the outer surface of the first nanoparticle, and the shape of the hybrid nanostructured photocatalysts may be formed to correspond to the shape of the first nanoparticle. For example, the second nanoparticles may be formed to be decorated on the surface of the first nanoparticle, and the second nanoparticles may be formed along the surface of the first nanoparticle so that the second nanoparticles are formed to maintain the shape of the first nanoparticle. For example, the Ag/AgX hybrid nanostructured photocatalysts comprising the first and second nanoparticles are formed, corresponding to the first nanoparticle. In the Ag/AgX hybrid nanostructured photocatalysts in which the second nanoparticles are formed on the first nanoparticle, the shape of the second nanoparticles is formed to correspond to a face-centered cubic (fcc) structure of the first nanoparticle. Accordingly, the shape of the Ag/AgX hybrid nanostructures also can be controlled according to the reaction temperature.

The first nanoparticle is composed of one, the second nanoparticle is composed of a plurality, and the multiple second nanoparticles are formed in a dendritic form on the outer surface of the first nanoparticle. At least a part of the first and second nanoparticles may have a crystal structure.

The dendritic structure may be a structure in which particles are formed in a branch-like shape when a rapid crystallization occurs.

The Ag/AgX hybrid nanostructured photocatalysts according to an exemplary embodiment of the present invention, for example, may have a band gap energy of 2.0 eV to 3.0 eV, and may cause a problem of reducing the photocatalytic efficiency when the band gap energy is below 2.0 eV or exceeds 3.0 eV.

A size of the second nanoparticle may be 5 nm to 25 nm. When the size is below 5 nm, it is difficult for the second nanoparticles to be formed on the first nanoparticle due to their small size, and the size thereof is not sufficient for SPR so that a visible light absorption may not be achieved. Additionally, the second nanoparticles with a size more than 25 nm may be difficult to constantly be formed on the first nanoparticle due to their big size, and may have reduced efficiency because the particles are agglomerated. The size of the second nanoparticle may preferably be 10 nm to 25 nm.

The polymer may have a nitrogen atom and an unshaved electron pair. The polymer may be at least one selected from the group consisting of polyethyleneimine (PEI), polyvinylpyrrolidone (PVP), polyethylene glycol (PEG), and polyvinyl alcohol (PVA). Preferably, the polymer may be polyethyleneimine.

Polyethyleneimine is used as a stabilizer in the present invention, and is useful for preparing nanoparticles comprising metals due to a property of the amine functional group attached to the polyethyleneimine. Without the presence of polyethyleneimine, there may be a problem in that AgX nanoparticles are agglomerated with one another during the formation of the AgX nanoparticles.

Preferably, an amount of the polymer may be 10 mg to 60 mg. The polymer having an amount below 10 mg may cause a problem of agglomerating the first nanoparticles due to lack of the amount as a stabilizer, and the capping effect of the first nanoparticle is reduced. Additionally, the polymer having an amount greater than 60 mg may have reduced photocatalytic efficiency, and the remarkable effect thereof has not been discovered.

More preferably, the amount of the polymer may be 20 mg to 50 mg.

The polyethyleneimine forms a coordination bond with the first nanoparticle or the second nanoparticle, and exist in a detachable state. Additionally, since the polyethyleneimine is not dissolved in an aqueous solution, the recovery is easy from recycle of the photocatalysts of the present invention.

Preferably, the weight ratio between the first nanoparticle and second nanoparticle is in a range of 1:0.03 to 1:0.76. If the weight ratio between the first nanoparticle and the second nanoparticle is below 1:0.03, reactions occur less frequently due to a low visible light absorption. Additionally, if the weight ratio between the first nanoparticle and the second nanoparticle exceeds 1:0.76, a semiconductor level of the first nanoparticle restrains MO degradation due to a reduced number of electron holes. In a non-limiting example of the present invention, the weight ratio of 1:0.242 may exhibit the best efficiency.

At least a part of the first and second nanoparticles may have a face-centered cubic structure. The first nanoparticles show the face-centered cubic structure. The AgCl nanoparticles mainly grow in the {111} direction because the nanoparticles have a minimum surface energy in a {100} plane of AgCl. Meanwhile, the main growth direction of the AgBr nanoparticles is the {100} direction due to the minimum surface energy of the {100} facet.

A second aspect of the present invention relates to a method for preparing the hybrid nanostructured photocatalyst according to above first aspect, and may comprise the following steps: 1) preparing an aqueous solution containing a silver precursor; 2) preparing a first nanoparticle by introducing a polymer and an electrolyte salt into the aqueous solution containing a silver precursor; and 3) forming a second nanoparticle on an outer surface of the first nanoparticle by mixing with a reducing agent in step 2.

Preferably, step 2 may further comprise controlling the shape of the first nanoparticle by heating, wherein the shape of the first nanoparticle may be at least one selected from the group consisting of a semi-sphere, a sphere, a truncated-cube, and a cube.

The silver precursor may be used as at least one selected from the group consisting of $AgBF_4$, $AgCF_3SO_3$, $AgClO_4$, $AgNO_3$, $AgPF_6$, and $Ag(CF_3COO)$, or a mixture thereof. Specifically, $AgNO_3$ may be preferable to be used as the silver precursor when preparing the first nanoparticles.

In step 2, the first nanoparticles can be prepared by introducing the silver precursors, polymers, and electrolyte salts. Herein, it may be preferable for the concentration of the silver precursors to be 0.01 M to 3.0 M. The silver precursors having the content below 0.01 M may lead to the formation of a PEI-$Ag^+$ complex in a large portion. Therefore, the formation rate of the first nanoparticles would be decreased, and it may induce the formation of the first nanoparticle nuclei in a small number due to low supersaturation. Whereas, the silver precursors having the content greater than 3.0 M may lead to the preparation of big, agglomerated nanoparticles because the first nanoparticles are not efficiently capped and stabilized during the reaction due to lack of the amount of the polymers. More preferably, the concentration of the silver precursors may be 0.1 M to 2.5 M.

Preferably, step 2 may be conducted at between room temperature and 100° C. With the low reaction temperature, the size of the produced first nanoparticles may not be even, and the preparation efficiency may be reduced. Additionally, the size thereof becomes even and the reaction rate becomes fast as the temperature increases, but there is no great difference in the improvement at above a certain temperature. Considering these properties of the reaction temperature, 30° C. to 90° C. of the reaction temperature may be preferable, but is not limited thereto as long as the reaction temperature remains below 100° C. Additionally, an average size of the first nanoparticles is gradually increased as the reaction temperature increases.

Additionally, water may be used as a solvent to prepare the first nanoparticles in step 2. With such aqueous route, the first nanoparticles may provide a state dispersed in the water, the dispersing solvent. In addition, a reducing agent may be dissolved in the water so that the second nanoparticles can be reduced from the first nanoparticles.

In step 3, the second nanoparticles may be formed by mixing the first nanoparticles prepared in above step 2 with a reducing agent. The reducing agent is at least one selected from the group consisting of ascorbic acid, sodium hydroxide (NaOH), potassium hydroxide (KOH), hydrazine ($N_2H_4$), sodium hydrophosphate ($NaH_2PO_4$), glucose, tannic acid, dimethyl formamide ($C_3H_7NO$), tetrabutylammonium borohydride, sodium borohydride ($NaBH_4$), calcium hydride ($CaH_2$), sodium hydride (NaH), lithium hydride (LiH), and lithium borohydride ($LiBH_4$). Preferably, the reducing agent may be $NaBH_4$.

In step 3, a portion of the second nanoparticles formed on the surface of the first nanoparticle may be increased as the amount of the reducing agent is increased. The second nanoparticles may be formed by reducing at least a part of the first nanoparticle, and may be formed to be decorated on the surface of the first nanoparticle.

The reducing agent in the aqueous solution may be added at a concentration of 0.1 mM to 15 mM. The reducing agent with the concentration below 0.1 mM causes the reaction time that forms the second nanoparticles by reducing the first nanoparticles to be too long, and causes the slow reduction rate, and thus the reduction reaction does not occur completely. Accordingly, it may lead a problem of deteriorating the yield. Whereas, the reducing agent having the concentration greater than 15 mM may lead to a rapid reaction time, but has a problem of obtaining even sized-nanoparticles. In addition, the portion of the first nanoparticles may be decreased so that the photocatalytic efficiency is reduced.

For example, the amount of the reducing agent may be 0.1 mL to 2.0 mL in the entire solution (10 mM). When the amount of the reducing agent is below 0.1 mL, it causes the slow reduction rate of the first nanoparticles. Additionally, there is no difference in the amount of the formed second nanoparticles when the amount of the reducing agent is greater than 2.0 mL.

The hybrid nanostructured photocatalysts may have a photocatalytic activity in a visible light region. Preferably, the visible light region may be 350 nm to 750 nm. An ultraviolet light region may fundamentally have the good photocatalytic activity, and in the case of an infrared light, the photocatalytic efficiency may be reduced due to a weak electromagnetic pulse.

The hybrid nanostructured photocatalysts have a photocatalytic reaction rate that is 1000-fold faster than N-deposited $TiO_2$ (P-25).

For the shape of the photocatalysts, the first nanoparticles may be in a dented state. In such a case, the second nanoparticles are not formed on the dented part of the first nanoparticle.

Hereinbelow, the present invention will be described in detail with accompanying exemplary embodiments. However, the exemplary embodiments disclosed herein are only for illustrative purposes and should not be construed as limiting the scope of the present invention.

Chemicals & Materials

Polyethyleneimine (PEI, MW=750,000, 50 wt % aqueous solution), silver nitrate ($AgNO_3$, ≥99%), sodium chloride (NaCl, ≥99.5%), sodium bromide (NaBr, ≥99%), sodium borohydride ($NaBH_4$), methylene blue (MB), and methyl orange (MO) were purchased from Aldrich and used without further purification. Water was purified by ion-exchange (deionized, DI water).

EXAMPLE 1

Synthesis of AgCl Nanoparticles 40 mg of PEI (MW=750,000, 50 wt % aqueous solution, Aldrich) was dissolved in deionized water (10 mL) and heated to 30° C. under magnetic stirring, followed by the addition of 0.1 mL of a $AgNO_3$ aqueous solution (1 M, Aldrich) into the reaction solution.

Thereafter, 0.25 mL of a NaCl aqueous solution (1 M) was rapidly added into the reaction solution using a pipette. A milky-colored dispersion liquid containing AgCl nanoparticles was heated and stirred for 3 minutes. The products were collected by centrifugation and washed with deionized (DI) water three times. The synthetic conditions of the AgCl nanoparticles of Example 1 are shown in Table 1.

TABLE 1

| Section | PEI | Deionized water | Temperature | $AgNO_3$ | NaCl |
|---|---|---|---|---|---|
| Example 1 | 40 mg | 10 mL | 30° C. | 1M, 0.1 mL | 1M, 0.25 mL |
| Example 2 | 40 mg | 10 mL | 50° C. | 1M, 0.1 mL | 1M, 0.25 mL |
| Example 3 | 40 mg | 10 mL | 70° C. | 1M, 0.1 mL | 1M, 0.25 mL |
| Example 4 | 40 mg | 10 mL | 90° C. | 1M, 0.1 mL | 1M, 0.25 mL |
| Comparative Example 1 | None | 10 mL | 30° C. | 1M, 0.1 mL | 1M, 0.25 mL |

EXAMPLES 2 to 4

Synthesis of AgCl Nanoparticles at Different Reaction Temperatures

As shown in Table 1, AgCl nanoparticles were synthesized via a precipitation reaction between $AgNO_3$ and NaCl in the presence of polyethyleneimine (PEI) as a stabilizer in an aqueous phase at different reaction temperatures. The AgCl nanoparticles were synthesized with the same method in Example 1, except the reaction temperatures were 50° C., 70° C., and 90° C., respectively.

SEM and TRSEM images, optical photographs, and absorption spectra of the obtained AgCl nanoparticles are shown in FIGS. 1 to 3, respectively. Additionally, dispersion diagrams of the particle size and XRD analysis results of the AgCl nanoparticles in the different reaction temperatures are shown in FIGS. 4 and 5, respectively. Meanwhile, FIG. 6 shows a FT-IR spectrum and a TGA thermal analysis of the AgCl nanoparticles synthesized in Example 1.

COMPARATIVE EXAMPLE 1

Synthesis of AgCl Nanoparticles in the Absence of PEI

As shown in Table 1, the experiment was conducted in the same manner as in Example 1, except that it was conducted in the absence of PEI. FIG. 7 shows an SEM image of the AgCl nanoparticles synthesized in Comparative Example 1.

EXAMPLE 5

Synthesis of Ag/AgCl Hybrid Nanostructures

The AgCl nanoparticles synthesized in Example 1 were re-dispersed in deionized water (5 mL), and then 2.0 mL of a $NaBH_4$ aqueous solution (10 mM) was added under magnetic stifling. The color of the resulting solution immediately changed from red to green, showing the formation of Ag/AgCl. After 2 minutes, the product was collected by centrifugation. The synthesis conditions of the Ag/AgCl hybrid nanostructures of Example 5 are shown in Table 2. FIG. 8 shows a schematic diagram of reaction pathways for the synthesis of the Ag/AgCl hybrid nanostructures.

TABLE 2

| Section | AgCl nanoparticles | Shape of AgCl nanoparticles | Deionized water | NaBH$_4$ aqueous solution |
|---|---|---|---|---|
| Example 5 | Example 1 | Semi-sphere | 5 mL | 10 mM, 2.0 mL |
| Example 6 | Example 2 | Sphere | 5 mL | 10 mM, 2.0 mL |
| Example 7 | Example 3 | Truncated-cube | 5 mL | 10 mM, 2.0 mL |
| Example 8 | Example 4 | Cube | 5 mL | 10 mM, 2.0 mL |

EXAMPLES 6 to 8

Synthesis of Ag/AgCl Hybrid Nanostructures According to Shape of AgCl Nanoparticles As shown in Table 2, the experiment was conducted in the same manner as in Example 5, except that the AgCl nanoparticles synthesized in Examples 2 to 4 were reacted with a NaBH$_4$ aqueous solution.

FIG. 9 shows XRD patterns of the Ag/AgCl hybrid nanoparticles of Examples 5 to 8

EXAMPLE 9 to 13

Change in Amount of Reducing Agent in Ag/AgCl Hybrid Nanostructures

TABLE 3

| Section | AgCl nanoparticles | Shape of AgCl nanoparticles | Deionized water | NaBH$_4$ aqueous solution |
|---|---|---|---|---|
| Example 5 | Example 1 | Semi-sphere | 5 mL | 10 mM, 2.0 mL |
| Example 9 | Example 1 | Semi-sphere | 5 mL | 10 mM, 0.1 mL |
| Example 10 | Example 1 | Semi-sphere | 5 mL | 10 mM, 0.3 mL |
| Example 11 | Example 1 | Semi-sphere | 5 mL | 10 mM, 0.5 mL |
| Example 12 | Example 1 | Semi-sphere | 5 mL | 10 mM, 1.0 mL |
| Example 13 | Example 1 | Semi-sphere | 5 mL | 10 mM, 1.5 mL |

As shown in Table 3, the experiment was conducted in the same manner as in Example 5, except that the amount of NaBH$_4$ was 0.1 mL, 0.3 mL, 0.5 mL, 1.0 mL, and 1.5 mL, respectively. The shape and composition of the Ag/AgCl hybrid nanostructures can be easily controlled by varying the amount of the reducing agent. The amount of NaBH$_4$ is 0.1 mL, 0.3 mL, 0.5 mL, 1.0 mL, 1.5 mL, and 2.0 mL, respectively. In addition, these products are noted as Ag/AgCl-0.1 to 2.0.

FIGS. 10a to 10f show SEM images for the shape changes of the Ag/AgCl hybrid nanostructures prepared by reacting the AgCl semi-spheres synthesized in Example 1 with different volumes of the NaBH$_4$ aqueous solution (10 mM). FIGS. 10g to 10i show TEM images and EDX elemental mapping analysis data for Example 5, respectively. FIG. 10j shows powder XRD patterns of the Ag/AgCl hybrid nanostructures of Examples 5, and 9 to 13.

FIG. 11 shows UV-vis absorption spectra for photocatalytic degradation of MO molecules using the photocatalysts in Examples 5, and 9 to 13 under the visible light irradiation shown in FIGS. 10a to 10f. FIGS. 12a and 12b show XPS spectra of the AgCl nanoparticles synthesized in Example 2, FIGS. 12c and 12d show XPS spectra of the Ag/AgCl-0.5 hybrid nanoparticles synthesized in Example 11, and FIGS. 12e and 12f show XPS spectra of the Ag/AgCl-2.0 hybrid nanoparticles synthesized in Example 5.

EXAMPLE 14

Synthesis of AgBr Nanoparticles 40 mg of PEI (MW=750,000, 50 wt % aqueous solution, Aldrich) was dissolved in deionized water (8 mL) and heated to a specific reaction temperature of 30° C. under magnetic stirring, followed by addition of 1.0 mL of a AgNO$_3$ aqueous solution (the final concentration of AgNO$_3$ per total reaction volume (10 mL) was 0.5 M). Thereafter, an equimolar NaBr aqueous solution (1.0 mL) was added to the reaction solution using a pipette. The resulting mixture was then heated at the same temperature and stirred for 3 minutes. The products were collected by centrifugation and washed with deionized (DI) water three times. The synthetic conditions of the AgBr nanoparticles in Example 14 are shown in Table 4.

TABLE 4

| Section | PEI | Deionized water | Temperature | AgNO$_3$ | NaBr |
|---|---|---|---|---|---|
| Example 14 | 40 mg | 8 mL | 30° C. | 1.0 mL, 0.5M | 1.0 mL, 0.5M |
| Example 15 | 40 mg | 8 mL | 50° C. | 1.0 mL, 0.5M | 1.0 mL, 0.5M |
| Example 16 | 40 mg | 8 mL | 70° C. | 1.0 mL, 0.5M | 1.0 mL, 0.5M |
| Example 17 | 40 mg | 8 mL | 90° C. | 1.0 mL, 0.5M | 1.0 mL, 0.5M |
| Comparative Example 2 | None | 8 mL | 30° C. | 1.0 mL, 0.5M | 1.0 mL, 0.5M |

EXAMPLES 15 to 17

Synthesis of AgBr Nanoparticles Under Different Reaction Temperatures

As shown in Table 4, the synthesis was conducted in the same manner as in Example 14, except conducted in different reaction temperatures, 50° C., 70° C., and 90° C.

EXAMPLES 18 to 22

Synthesis of AgBr Nanoparticles According to Concentration Changes of AgNO$_3$

As shown in Table 5, the synthesis was conducted in the same manner as in Example 15, except that 1.0 mL of a AgNO₃ aqueous solution (0.1 M to 2.5 M) was added followed by addition of an equimolar NaBr solution (1.0 mL).

TABLE 5

| Section | PEI | Deionized water | Temperature | AgNO₃ | NaBr |
|---|---|---|---|---|---|
| Example 15 | 40 mg | 8 mL | 50° C. | 1.0 mL, 0.5M | 1.0 mL, 0.5M |
| Example 18 | 40 mg | 8 mL | 50° C. | 1.0 mL, 0.1M | 1.0 mL, 0.1M |
| Example 19 | 40 mg | 8 mL | 50° C. | 1.0 mL, 1.0M | 1.0 mL, 1.0M |
| Example 20 | 40 mg | 8 mL | 50° C. | 1.0 mL, 1.5M | 1.0 mL, 1.5M |
| Example 21 | 40 mg | 8 mL | 50° C. | 1.0 mL, 2.0M | 1.0 mL, 2.0M |
| Example 22 | 40 mg | 8 mL | 50° C. | 1.0 mL, 2.5M | 1.0 mL, 2.5M |

COMPARATIVE EXAMPLE 2

Synthesis of AgBr Nanoparticles in the Absence of PEI

As shown in Table 4, the synthesis was conducted in the same manner as in Example 15, except that it was conducted in the absence of PEI

EXAMPLE 23

Synthesis of Ag/AgBr Hybrid Nanostructures

The AgBr nanoparticles synthesized in Example 15 were re-dispersed in deionized water (4 mL), and then 1.0 mL of NaBH₄ solution (0.2 mM) was added under magnetic stirring at room temperature. After 2 minutes, the product was collected by centrifugation. The synthetic conditions of Ag/AgBr nanoparticles of Example 23 are shown in Table 6

EXAMPLES 24 to 28

Concentration Variation of a Reducing Agent in Ag/AgBr Hybrid Nanostructures

As shown in Table 6, the experiment was conducted in the same manner as in Example 23, except that different concentrations of NaBH₄, such as 0.6 mM, 1.0 mM, 2.0 mM, 4.0 mM, and 6.0 mM, were added, respectively.

TABLE 6

| Section | AgBr nanoparticles | Deionized water | NaBH₄ aqueous solution |
|---|---|---|---|
| Example 23 | Example 15 | 4 mL | 10 mL, 0.2 mM |
| Example 24 | Example 15 | 4 mL | 10 mL, 0.6 mM |
| Example 25 | Example 15 | 4 mL | 10 mL, 1.0 mM |
| Example 26 | Example 15 | 4 mL | 10 mL, 2.0 mM |
| Example 27 | Example 15 | 4 mL | 10 mL, 4.0 mM |
| Example 28 | Example 15 | 4 mL | 10 mL, 6.0 mM |

Assessment Item—Cases of AgX Nanoparticles and Ag/AgX Hybrid Nanostructures

The shape and composition of the sample were recorded by a scanning electron microscope (SEM, LEO SUPRA 55) and energy-dispersive X-ray spectroscopy (EDS, INCA, Oxford Company). Transmission electron microscope (TEM) images were captured using a JEM-2100F microscope operated at 200 kv. The UV-vis spectra were recorded using a Jasco UV-vis spectrophotometer. Fourier transform infrared spectra (FT-IR) were taken using a Jasco FT-IR-6100. The powder X-ray Diffraction (XRD) patterns were obtained using a Rigaku D-MAX/A diffractometer at 35 kV and 35 mA. X-ray photoelectron spectroscopy (XPS) measurements were conducted using a Thermo Scientific K-Alpha spectrometer with a TAl Kα X-ray source. Thermo gravimetric analysis (TGA) was performed using a TGA Q5000 IR thermal analyzer.

The AgCl nanoparticles, Ag/AgCl hybrid nanostructures, AgBr nanoparticles, and Ag/AgBr hybrid nanostructures were analyzed through the assessment items above.

EXPERIMENTAL EXAMPLE 1

Measurement of Physical Properties of AgCl

FIG. 1 shows SEM and HRSEM images of the AgCl nanoparticles prepared by reacting NaCl with AgNO₃ in the presence of PEI at different reaction temperatures; a) 30° C., b) 50° C., c) 70° C., and d) 90° C. Additionally, FIGS. 1e to 1h show SEM images of Ag/AgCl hybrid nanostructures synthesized by reacting the AgCl nanoparticles (shown in FIGS. 1a to 1d, respectively) with 2.0 mL of NaBH₄ (10 mM). FIGS. 1a to 1d show SEM images of the AgCl nanoparticles prepared at different reaction temperatures, such as 30° C., 50° C., 70° C., and 90° C. In addition, the shape of the nanoparticles appeared as a semi-sphere, a sphere, a truncated-cube, and a cube.

FIG. 2 shows optimal images of aqueous suspensions of the AgCl nanoparticles prepared at the different temperatures shown in FIGS. 1a to 1d. As shown in FIG. 2, the colors of aqueous dispersions of the AgCl nanoparticles were milky at 30° C., dark pink at 50° C., amber at 70° C.a, and dark yellow at 90° C. FIG. 3 shows absorption spectra of the AgCl nanoparticles shown in FIGS. 1a to 1d. As shown in FIG. 3, all the nanoparticles exhibited the strong absorption peak at 241 mm which corresponds to a direct band gap of AgCl (5.15 eV) and a weak peak from an indirect band gap (382 nm, 3.25 eV). FIG. 4 shows dispersion diagrams of each particle size of the AgCl nanoparticles shown in FIGS. 1a to 1d. FIG. 4a corresponds to 30° C., FIG. 4b corresponds to 50° C., FIG. 4c corresponds to 70° C., and FIG. 4d corresponds to 90° C., respectively. As shown in FIG. 4, average sizes of the AgCl nanoparticles were 154.2±26.3 nm for semi-spheres synthesized at 30° C., 191.2±28.4 nm for spheres synthesized at 50° C., 204.7±29.8 nm for truncated-cubes synthesized at 70° C., and 344.2±44.4 nm for cubes synthesized at 90° C. Additionally, the size of the AgCl nanoparticles was gradually increased with increasing reaction temperature. FIG. 5 shows XRD patterns of the AgCl nanoparticles shown in FIGS. 1a to 1d. As shown in FIG. 5, the powder X-ray XRD patterns of the AgCl nanoparticles showed diffraction peaks at 27.9°, 32.3°, 46.3°, 54.9°, 57.5°, and 67.4°, which correspond to (111), (200), (220), (311), (222), and (400) planes of face-centered cubic (fcc) AgCl, respectively (Fm3m, a=5.5491 Å, Joint Committee on Powder Diffraction Standards (JCPDS) file no. 31-1238).

A Fourier transform infrared (FT-IR) transmission spectrum of the AgCl nanoparticles exhibited a distinct band at 1645 cm$^{-1}$, which corresponds to the bending vibration of amine groups (—N—H). FIG. 6a shows an FT-IR spectrum of the AgCl nanoparticles synthesized at 30° C. shown in FIG. 1a, and FIG. 6b shows a graph of TGA thermal analysis thereof. As shown in FIG. 6a, the absorption peaks at 1260 cm$^{-1}$ and 1022 cm$^{-1}$ correspond to the stretching bands of —C—H, and —C—N, respectively. As shown in FIG. 6b, thermal gravimetric analysis (TGA) results of the AgCl nanoparticles showed about 21% weight loss at 600° C., and the remained weight was kept stable after the reaction. Both FT-IR and TGA analysis results confirmed the presence of PEI on the surface of the AgCl nanoparticles FIG. 8 shows a schematic diagram of reaction pathways for the synthesis of the Ag/AgCl hybrid nanostructures. In the synthesis of the Ag nanoparticles using PEI as a stabilizer, non-bonding electrons of the amine group in PEI interacted with Ag$^+$ to form a PEI-Ag$^+$ complex in the aqueous phase, as shown in FIG. 8. Therefore, the growth rate of the Ag nanoparticles was controlled. In the present invention, PEI serves as a multi-functional stabilizer to modulate the reaction rate between Ag$^+$ and Cl$^-$ to form a PEI-Ag$^+$ complex and nanoparticle-sized AgCl particles by capping the surface of the particles. FIG. 7 shows a SEM image of the AgCl nanoparticles prepared under the same conditions of FIG. 1a, except that it was conducted in the absence of PEI. When the synthesis was conducted in the absence of PEI as shown in FIG. 7, micrometer-sized agglomerated AgCl particles were formed, demonstrating that PEI played a pivotal role in the formation of AgCl nanoparticles.

The shape of the AgCl nanoparticles was changed from semi-spheres (FIG. 1a) to cubes when the reaction temperature was increased from 30° C. to 90° C. while maintaining other experimental conditions unchanged. For better understanding, the intensity ratio of I$_{(200)}$/I$_{(111)}$ is 2.0 in the JCPDS file when the intensity ratio of I$_{(200)}$/I$_{(111)}$ in the XRD data of the AgCl nanoparticles is compared. As shown in FIG. 5, the peak intensity ratio for the AgCl semi-spheres synthesized at 30° C. was 1.95, whereas the AgCl nanocubes exhibited a ratio of 35.6, which is supported in the SEM images. These SEM images and XRD analysis suggest that the AgCl nanoparticles grow mainly along the <111> direction at higher temperatures because the {100} facets of AgCl possess minimum surface energy and Cl$^-$ ions in the {100} facets are saturated by Ag$^+$ ions.

EXPERIMENTAL EXAMPLE 2

Measurement of Physical Properties of Ag/AgCl Hybrid Nanostructures

As shown in FIG. 8, the AgCl nanoparticles were reduced using NaBH$_4$ at room temperature in order to prepare the Ag/AgCl hybrid nanostructures. FIGS. 1e to 1h show SEM images of the Ag/AgCl hybrid nanostructures prepared by reacting NaBH$_4$ (2.0 mL) with the AgCl nanoparticles (10 mM) of Examples 1 to 4. In FIGS. 1f to 1h, hybrid structures, in which 10 nm to 25 nm sized small Ag nanoparticles are decorated, were observed for the shape of spheres (167.9±23.8), truncated-cubes (185.6±27.2), and cubes (315.7±41.6), respectively. FIG. 9 shows XRD patterns of the Ag/AgCl hybrid nanostructures prepared by respectively reacting 2.0 mL of NaBH$_4$ (10 mM) with the AgCl nanoparticles shown in FIGS. 1a to 1d. As shown in FIG. 9, the XRD patterns of the Ag/AgCl hybrid nanostructures exhibited additional (111) and (200) planes of a face-centered cubic metallic Ag (Fm3m, a=4.086 Å, JCPDS file no. 04-0783).

The shape and composition of Ag/AgCl hybrid nanostructures can be easily controlled by varying a concentration of a reducing agent. FIGS. 10a to 10f show SEM images of the Ag/AgCl hybrid nanostructures synthesized by reacting the AgCl semi-spheres in FIG. 1a with different volumes of NaBH$_4$ (10 mM); a) 0.1 mL (Ag/AgCl-0.1), b) 0.3 mL (Ag/AgCl-0.3), c) 0.5 mL (Ag/AgCl-0.5), d) 1.0 mL (Ag/AgCl-1.0), e) 1.5 mL (Ag/AgCl-1.5), and f) 2.0 mL (Ag/AgCl-2.0). FIG. 10g shows a TEM image of the Ag/AgCl-2.0 shown in FIG. 10f. In addition, FIGS. 10h and 10i show EDX elemental mapping analysis data of the Ag/AgCl-2.0 shown in FIG. 10f. FIG. 10j shows powder XRD pattern of the Ag/AgCl hybrid nanostructures shown in FIGS. 10a to 10f. The SEM images in FIGS. 10a to 10f show changes in the shape of the Ag/AgCl hybrid nanostructures prepared by reacting the AgCl semi-spheres synthesized at 30° C. with different volumes of a NaBH$_4$ solution (10 mM) (the volumes of NaBH$_4$ are 0.1 mL, 0.3 mL, 0.5 mL, 1.0 mL, 1.5 mL, and 2.0 mL, respectively. These products are noted as Ag/AgCl-0.1 to 2.0). As shown in FIGS. 10a and 10b, it was discovered that the small nanoparticles with sizes of 5 nm to 10 nm (Ag/AgCl-0.1) and 15 nm to 25 nm (Ag/AgCl-0.3) were attached to the surface of the AgCl nanoparticles when 0.1 mL and 0.3 mL of the NaBH$_4$ aqueous solutions are reacted with the AgCl nanoparticles. Such nanoparticles are appeared to have a dendritic structure. As shown in FIGS. 10c and 10d, by further increasing the amount of a reducing agent to 0.5 mL and 1.0 mL, small-sized hollow spheres and hollow cage particles started to be observed while the major product sill consisted of AgCl nanoparticles decorated with Ag nanoparticles.

As shown in FIGS. 10e and 10f, under the reaction conditions using 1.5 mL and 2.0 mL of a NaBH$_4$ aqueous solution as a reducing agent, the SEM images show the formation of nanostructures with a hollow interior shape. As shown in FIGS. 10g to 10i, the TEM images and EDX elemental mapping data of the Ag/AgCl-2.0 clearly exhibited the formation of hollow cages at high NaBH$_4$ concentrations.

The composition of the Ag/AgCl hybrid nanostructures was analyzed using energy dispersive X-ray spectroscopy (EDS). The atomic ratio of AgCl to Ag increased from 0 (AgCl nanoparticles) to 36.61 (Ag/AgCl-2.0), indicating that 97.34% of the AgCl was reduced to Ag. FIG. 11 shows UV-vis absorption spectra of the Ag/AgCl hybrid nanostructures shown in FIGS. 10a to 10f. As shown in FIG. 11, the optical absorption spectra taken from an aqueous suspension of the synthesized Ag/AgCl hybrid nanostructures show the presence of strong plasmon resonance peaks (SPR) around 415 nm to 420 nm. The absorption peak rose in intensity from Ag/AgCl 0.1 to 2.0, showing more absorption of visible light due to the enhanced Ag. As shown in FIG. 10j, the XRD patterns of the Ag/AgCl hybrid nanostructures show the presence of (111) and (200) planes of face-centered cubic (fcc) metallic Ag (JCPDS file no. 04-0783), indicating the formation of Ag and AgCl crystal structures. Interestingly, the diffraction peaks of AgCl were gradually decreased in intensity and the peak from the (111) plane of AgCl finally disappeared in Ag/AgCl-2.0, while that of Ag at 38.1° (111) rose from Ag/AgCl-0.1 to 2.0.

These observations were further confirmed by X-ray photoelectron spectroscopy (XPS) analysis. FIGS. 12a and 12b show XPS spectra of the AgCl nanoparticles shown in FIG. 1b, FIGS. 12c and 12d show XPS spectra of the Ag/AgCl-0.5 shown in FIG. 10c, and FIGS. 12e and 12f show XPS spectra of the Ag/AgCl-2.0 shown in FIG. 10f. As shown in FIG. 12a, two distinct peaks corresponding to the binding energies of Ag $3d_{5/2}$ and Ag $3d_{3/2}$ core levels were observed at 367.3 eV and 373.2 eV, indicating that $Ag^+$ was a major species in the product. As shown in FIG. 12b, the Cl 2p core level spectrum included a Cl $2P_{3/2}$ peak at 197.6 eV and a Cl $2P_{1/2}$ peak at 199.2 eV, respectively. In addition, it corresponds to $Cl^-$. As shown in FIG. 12c, two sets of 3d peaks were observed in the Ag 3d XPS core level spectrum of the Ag/AgCl-0.5.

One set consisted of Ag $3d_{5/2}$ and Ag $3d_{3/2}$ peaks at 367.5 eV and 373.5 eV, respectively, which corresponds to $Ag^+$ in the AgCl. The other set included Ag $3d_{5/2}$ and Ag $3d_{3/2}$ peaks at 368.0 eV and 374.2 eV, respectively, which corresponds to metallic Ag. Additionally, as shown in FIG. 12d, the XPS peak intensity of $Cl^-$ was decreased when compared to the peak intensity of the AgCl nanoparticles, and it corresponds to a low portion of AgCl in the product. As shown in FIGS. 12e and 12f, in the Ag/AgCl-2.0, the intensity peaks of Ag were much greater compared to those of the $Ag^+$ species, and the peak of the $Cl^-$ species was also decreased to a minimum. These XPS results clearly show the formation of the Ag/AgCl hybrid nanostructures in the present synthesis.

EXPERIMENTAL EXAMPLE 3

Measurement of Physical Properties of Photocatalysts of Ag/AgCl Hybrid Nanostructures Methyl orange (MO) was selected as a target organic compound for investigating the visible light-driven photocatalytic performance of various prepared photocatalysts. The respective photocatalysts (30 mg) were dispersed in 50 mL of a MO aqueous solution (20 mg/L). The mixture was stored in darkness while being stirred for 30 minutes to establish an adsorption-desorption equilibrium of MO molecules on the photocatalysts. The photocatalytic test was performed under visible light irradiation using a 200 W mercury xenon lamp (Raynics, Korea) having a UV cut-off filter (>400 nm). Aliquots of the suspension (2.0 mL) were taken out from the reaction system at different reaction times, and centrifuged at 10,000 rpm to remove the photocatalysts from the solution. Supernatants were transferred to a UV-vis cuvette for measuring their absorption spectra in the range of 300 nm to 800 nm. For recycling experiments, the photocatalysts were centrifuged, washed, and collected. For subsequent recycling tests, all of the procedures were conducted the same as the first cycle.

FIG. 13a shows a schematic diagram of the proposed degradation mechanism of MO using Ag/AgCl plasmonic photocatalysts, and FIGS. 13b and 13c show graphs of photocatalytic degradation of MO using the Ag/AgCl hybrid nanostructures. FIG. 13b shows normalized concentrations of MO as a function of time on both linear and logarithmic scales, FIG. 13c shows the normalized concentrations of MO for different photocatalysts on a logarithmic scale, and FIG. 13d shows photodegradation kinetics of MO for five consecutive cycles with the same batch of Ag/AgCl-0.5. As shown in FIG. 13a, the photocatalytic performance of the Ag/AgCl hybrid nanostructures was investigated during the degradation of methyl orange (MO) under visible light irradiation. The present inventors investigated the kinetic process of photodegradation by monitoring the intensity of the absorption peak at 464 nm associated with MO as a function of time. FIG. 14 shows UV-vis absorption spectra for photocatalytic degradation of MO molecules using Ag/AgCl-0.5 under visible light irradiation. FIG. 14 shows photodegradation curves of MO using Ag/AgCl-0.5 as a photocatalyst. After adding the photocatalyst, the intensity was rapidly decreased at 464 nm of the absorption peak as the photocatalytic reaction proceeded, revealing that MO molecules can be effectively degraded under visible light irradiation in the presence of Ag/AgCl hybrid nanostructures.

Organic dyes in an aqueous solution often form aggregates of dimmers or high polymers in the short wavelength region, and the polymer or surfactants sometimes detach from the surface of the catalysts to occasionally affect the photocatalytic process. Absorption performance in the degradable product of MO molecules could not be observed in the scan spectral region during the MO degradation process, indicating good structural intensity of the PEI-stabilized Ag/AgCl hybrid nanostructures in the harsh photocatalytic environment. FIG. 13b shows dependence of the concentration (C) of the normalized MO against the concentration $(C_0)$ at the start of the reaction when Ag/AgCl-0.5 is used as a photocatalyst, showing that the degradation reaction has a first order reaction formula.

$$dC/dt = -kC, \quad (1)$$

$$\ln(C/C_0) = -kt, \quad (2)$$

wherein, k is the rate constant. The rate constant of degraded MO using Ag/AgCl-0.5 is 0.1638 $min^{-1}$. For comparison, as shown in FIG. 13c, MO degradation was conducted using Ag/AgCl-0.1, 0.3, 1.0, and N-doped $TiO_2$ (P-25) which are reference photocatalysts under visible light irradiation. FIG. 15 shows $\ln(C/C_0)$ velocity gradients on reaction times for MO degradation using different photocatalysts. As shown in FIG. 15, the rate constant was measured to be 0.0108 $min^{-1}$ for Ag/AgCl-0.1, 0.0324 $min^{-1}$ for Ag/AgCl-0.3, 0.0074 $min^{-1}$ for Ag/AgCl-1.0, and 0.0001 $min^{-1}$ for P-25.

The degradation rates of MO by Ag/AgCl-0.5 were 15, 5, 22, and 1638 factors, respectively, which were faster than Ag/AgCl-0.1, 0.3, 1.0, and P-25. These results indicate that Ag/AgCl-0.5 exhibits the best performance. The excellent visible light-driven photocatalytic performance of Ag/AgCl-0.5 hybrid nanostructures attributes to the positive synergistic effect between metallic Ag and semiconducting AgCl. Although Ag/AgCl-1.0 contains a large amount of metallic Ag (92.58%) compared to that of Ag/AgCl-0.5, the low level of semiconducting AgCl limits MO degradation.

EXPERIMENTAL EXAMPLE 4

Recycle of Ag/AgCl Hybrid Nanostructures

In addition to efficiency, stability, and/or recyclability, photocatalysts are also important for applications because photocatalysts often lose their photocatalytic performance due to photo-corrosion. As shown in FIG. 13d, recycling photodegradation experiments of MO were conducted five times in order to test stability of the Ag/AgCl-0.5 hybrid nanostructures. The photocatalytic performance did not show a significant decrease after repeated use of the catalyst. FIG. 16a shows an SEM image of Ag/AgCl-0.5 catalysts upon five consecutive photocatalytic reactions, and FIG. 16b shows XRD pattern thereof. As shown in FIG. 16, the SEM image and XRD pattern of the Ag/AgCl-0.5 recycled five times are almost identical to original samples. These observations indicate that neither the shape nor the phase composition is changed during recycling tests, and the Ag/AgCl hybrid nanostructures exhibit excellent stability against photo-corrosion.

EXPERIMENTAL EXAMPLE 5

Measurement of Physical Properties of AgBr

The overall synthetic pathways to make the Ag/AgBr hybrid nanostructures are roughly shown in FIG. 17. FIG. 17 shows a schematic diagram of reaction pathways for synthesizing the Ag/AgBr hybrid nanostructures. The AgBr nanoparticles were synthesized through a precipitation reaction between $AgNO_3$ and NaBr in the presence of polyethyleneimine (PEI) in an aqueous solution at different reaction temperatures for 3 minutes. Upon the addition of NaBr solution, the color rapidly changed to greenish-yellow, indicating the formation of colloid AgBr nanoparticles. FIGS. 18a to 18d show SEM images of the AgBr nanoparticles prepared by reacting NaBr (0.5 M) with $AgNO_3$ in the presence of PEI at various reaction temperatures; a) 30° C., b) 50° C., c) 70° C., and d) 90° C. FIGS. 18a to 18d show scanning electron microscope (SEM) images of the AgBr nanoparticles synthesized by reacting NaBr with a $AgNO_3$ solution (0.5 M) at 30° C., 50° C., 70° C., and 90° C. In addition, an average size of the AgBr nanoparticles is 124.7±23.5 nm, 128.3±24.3 nm, 184.6±44.5 nm, and 228.4±48.1 nm, respectively. FIG. 19 shows dispersion diagrams of a particle size of the AgBr nanoparticles synthesized at various reaction temperatures shown in FIGS. 18a to 18d. The reaction temperatures were a) 30° C., b) 50° C., c) 70° C., and d) 90° C. As shown in FIG. 19, the average size and size distribution of the AgBr nanoparticles were gradually increased as the reaction temperature was increased from 25° C. to 90° C. FIG. 20 shows XRD patterns of the AgBr nanoparticles synthesized at various reaction temperatures shown in FIGS. 18a to 18d. As shown in FIG. 20, the powder X-ray XRD patterns of the AgBr nanoparticles exhibited diffraction peaks at 26.7°, 31.0°, 44.3°, 55.1°, 64.5°, and 73.3°, which show (111), (200), (220), (222), (400), and (420) planes of face-centered cubic (fcc) AgBr (Fm3m, a=5.7745 Å, Joint Committee on Powder Diffraction Standards (JCPDS) file no. 06-0438).

The shape of the AgBr nanoparticles changes from semi-spheres to cubes when the reaction temperature was increased from 30° C. to 90° C., while maintaining other experimental conditions (FIG. 18). In the JCPDS file, the intensity ratio of I(200)/I(220) is 1.8 (JCPDS file no. 06-0438). As shown in FIG. 20, the peak intensity ratio of the AgBr semi-spheres synthesized at 0° C. is 1.8, whereas the AgBr nanocubes exhibit a ratio of 8.9. These observations demonstrate that the main growth direction of the AgBr nanoparticles at high temperatures indicates the <100> direction of face-centered cubic (fcc) AgBr due to the minimum surface energy of the {100} facets.

In the synthesis of the AgBr nanoparticles, the $AgNO_3$ concentration was adjusted from 0.1 M to 2.5 M under the same reaction conditions shown in FIG. 18b in order to confirm an effect of the $AgNO_3$ concentration. FIGS. 21a to 21e show SEM images of the AgBr nanoparticles prepared under the same conditions shown in FIG. 18b, besides various $AgNO_3$ concentrations were used. The $AgNO_3$ concentrations were a) 0.1 M, b) 1.0 M, c) 1.5 M, d) 2.0 M, and e) 2.5 M. As shown in FIG. 21a, the SEM image shows big particles with an average size of 184.1±45.4 nm at a low concentration of $AgNO_3$ (0.1M). As already shown in FIG. 18b, small AgBr nanoparticles having narrow size distributions at a high concentration of $AgNO_3$ (0.5 M) were obtained. As shown in FIGS. 21b to 21e, when the $AgNO_3$ concentration was increased to 1.0 M, 1.5 M, 2.0 M, and 2.5 M, the particle size increased to 52.3±41.2 nm, 164.2±58.2, 175.4±68.7 nm, and 240.3±145.0 nm, respectively. FIG. 22 shows a SEM image of the AgBr nanoparticles prepared under the same conditions shown in FIG. 18b, except that it was progressed in the absence of PEI. As shown in FIG. 22, micrometer-sized agglomerated AgBr particles were formed when the synthesis was conducted in the absence of PEI. It demonstrates that PEI played a pivotal role in the formation of AgBr nanoparticles. A large portion of PEI-$Ag^+$ complexes may be formed in a low concentration of $AgNO_3$. Therefore, it may reduce the formation rate of AgBr and induce the formation of a small number of AgBr nuclei due to the low supersaturation. Most of the AgBr monomers are used for the growth of AgBr nanoparticles, increasing the size of AgBr nanoparticles. In contrast, at relatively high $AgNO_3$ concentrations, because of the shortage of PEI, the AgBr nanoparticles were not effectively capped and stabilized during the reaction, resulting in the formation of large and agglomerated nanoparticles.

EXPERIMENTAL EXAMPLE 6

Measurement of Physical Properties of Ag/AgBr Hybrid Nanostructures

FIGS. 23a to 23f show SEM images of the Ag/AgBr hybrid nanostructures prepared by reacting $NaBH_4$ (1 mL) with the AgBr nanoparticles shown in FIG. 18b at different concentrations; a) 0.2 mM (Ag/AgBr-0.2), b) 0.6 mM (Ag/AgBr-0.6), c) 1.0 mM (Ag/AgBr-1), d) 2.0 mM (Ag/AgBr-2), e) 4.0 mM (Ag/AgBr-4), and f) 6.0 mM (Ag/AgBr-6). FIG. 23g shows a TEM image of the Ag/AgBr-6 shown in FIG. 23f, and FIGS. 23h and 23i show EDX elemental mapping analysis data of the Ag/AgBr-6 shown in FIG. 23f. As shown in FIG. 23, the Ag/AgBr hybrid nanostructures were synthesized by reduction of the AgBr nanoparticles shown in FIG. 18b using $NaBH_4$ at room temperature. The shape and composition of Ag/AgBr hybrid nanostructures may be easily controlled by varying a concentration of a reducing agent. The SEM images of FIGS. 23a to 23f show a formation change of the Ag/AgBr hybrid nanostructures synthesized by reacting AgBr nanoparticles with a $NaBH_4$ solution of various concentrations. The concentration of the $NaBH_4$ solution to be added was 0.2 mM, 0.6 mM, 1.0 mM, 2.0 mM, 4.0 mM, and 6.0 mM, respectively, and these products were noted as Ag/AgBr-0.2 to 6. As shown in FIG. 23a, when a $NaBH_4$ solution (0.2 mM) was reacted with the AgBr nanoparticles, a small portion of the Ag/AgBr hybrid nanostructures, which have small Ag nanoparticles with sizes of 5 nm that are attached to the surface of the AgBr nanoparticles, were observed. As shown in FIGS. 23b to 23d, as $NaBH_4$ concentration was increased to 0.6 mM, 1.0 mM, and 2.0 mM, dendrite-like nanostructures, that is, Ag/AgBr-0.6 and Ag/AgBr-1 nanostructures consisting of AgBr nanoparticles decorated by 5 nm to 10 nm-sized Ag nanoparticles, and Ag/AgBr-2 nanostructures consisting of AgBr nanoparticles decorated by 10 nm to 20 nm-sized Ag nanoparticles, were synthesized. Interestingly, as shown in FIGS. 23e and 23f, at high $NaBH_4$ concentrations of 4.0 mM and 6.0 mM, hollow cage-like nanostructures were observed in the SEM analysis. The TEM image and EDX elemental mapping data of the Ag/AgBr-6 shown in FIGS. 23f, and 23g to 23i reveal that the hollow nanostructures mainly contain Ag along with a little portion of AgBr.

The composition of constitutional elements of the Ag/AgBr hybrid nanostructures was analyzed using EDS. As shown in Table 7, the atomic ratio of AgBr to Ag was increased from 0 (AgBr nanoparticles) to 12.37 (Ag/AgCl- 6), indicating that 92.52% of the AgBr was converted to Ag during the reaction. FIG. 24a shows powder XRD pattern of the Ag/AgBr hybrid nanostructures shown in FIGS. 23a to 23f, and FIG. 24b shows UV-vis absorption spectra of the Ag/AgBr hybrid nanostructures shown in FIGS. 23a to 23f. As shown in FIG. 24a, the XRD patterns of the Ag/AgBr hybrid nanostructures showed the presence of an additional peak at the scattering angle of 38.2°, which corresponds to the (111) plane of face-centered cubic (fcc) metallic Ag (Fm3m, a=4.086 Å, JCPDS file no. 04-0783). In addition, it indicates the formation of Ag by addition of $NaBH_4$ to the AgBr nanoparticles. The main diffraction peaks of AgBr at 31.0° (111) and 44.3° (220) gradually decreased in intensity by increasing the $NaBH_4$ concentration. However, the diffraction peaks of Ag at 38.1° (111) rose remarkably from Ag/AgBr-0.6 to 6. As shown in FIG. 24b, the UV-vis absorption spectra of the synthesized Ag/AgBr hybrid nanostructures exhibited the presence of strong plasmon resonance peaks (SPR) at 418 nm. FIG. 25 shows a UV-vis absorption spectrum of the AgBr nanoparticles prepared at 50° C. shown in FIG. 18b. As shown in FIG. 25, in the absence of a reducing agent, the AgBr nanoparticles exhibited an absorption peak at 480 nm, which correspond to an indirect band gap of 2.6 eV. As the intensity increased from Ag/AgBr-0.2 to 6, the SPR peak exhibited more visible light absorption due to the high metallic Ag content.

TABLE 7

| Nanostructure | Atomic % of Ag | Atomic % of Br | Atomic ratio of $^a$Ag:AgBr | Reduction % of $^b$Ag |
| --- | --- | --- | --- | --- |
| AgBr | 50.02 | 49.98 | 0.00 | 0.08 |
| Ag/AgBr-0.2 | 57.46 | 42.54 | 0.35 | 25.96 |
| Ag/AgBr-0.6 | 67.85 | 32.15 | 1.11 | 52.61 |
| Ag/AgBr-1 | 77.29 | 22.71 | 2.40 | 70.61 |
| Ag/AgBr-2 | 83.68 | 16.32 | 4.13 | 80.49 |
| Ag/AgBr-4 | 90.38 | 9.62 | 8.39 | 89.36 |
| Ag/AgBr-6 | 93.04 | 6.96 | 12.37 | 92.52 |

XPS analysis was conducted in order to further investigate the chemical condition and presence of metallic Ag nanoparticles. FIGS. 26a and 26b show XPS spectra of the AgBr nanoparticles shown in FIG. 18b, and FIGS. 26c and 26d show XPS spectra of the Ag/AgBr-6 hybrid nanostructures shown in FIG. 23f. As shown in FIG. 26a, in the AgBr nanoparticles prepared at 50° C., the binding energies of the Ag $3d_{5/2}$ and Ag $3d_{3/2}$ core levels exhibited two peaks at 367.2 eV and 373.4 eV, indicating that $Ag^+$ ions were a major species in the product. As shown in FIG. 26b, the 3d core level spectrum of bromine was divided into two peaks at 68.9 eV and 69.8 eV, corresponding to Br $3d_{5/2}$ and Br $3d_{3/2}$, respectively. On the other hand, as shown in FIG. 26c, the fitted peak exhibited the presence of two different components in the Ag 3d XPS core level spectrum of Ag/AgBr-6. That is, the peaks at 367.4 eV and 373.5 eV exhibited Ag $3d_{5/2}$ and Ag $3d_{3/2}$, respectively, which corresponds to $Ag^+$ in the AgBr. A Ag $3d_{5/2}$ peak was at 368.1 eV, and a Ag $3d_{3/2}$ peak was at 374.1 eV, which clearly indicates the presence of metallic Ag. Additionally, as shown in FIG. 26d, the intensity of the XPS peaks of Br$^-$ decreased compared to those of the AgBr nanoparticles, indicating a low portion of AgBr in the Ag/AgBr-6. These XPS results clearly show the formation of the Ag/AgBr hybrid nanostructures in the present synthesis. A stabilizer on the surface of the Ag/AgBr hybrid nanostructures was also investigated by FT-IR and TGA analysis. The FT-IR spectrum of the Ag/AgBr-6 nanoparticles, as shown in FIG. 23f, exhibited distinct bands at 3456 cm$^{-1}$ and 1642 cm$^{-1}$, which corresponds to stretching and bending bands of amine groups (—N—H). FIG. 27 shows an FT-IR spectrum of the Ag/AgBr hybrid nanostructures shown in FIG. 23f. As shown in FIG. 27, the absorption peaks corresponding to the bending vibrations of —C—H moieties were at 2843 cm$^{-1}$, and the peaks corresponding to bending and stretching vibrations of —C—H and —C—N were at 1385 cm$^{-1}$ and 1066 cm$^{-1}$, respectively. FIG. 28 shows a graph of TGA thermal analysis of the Ag/AgBr hybrid nanostructures shown in FIG. 23f. As shown in FIG. 28, the TGA results of the Ag/AgBr-6 nanoparticles exhibited an approximately 4% weight loss at temperatures as high as 600° C., and the remained weight was stably maintained after the reaction. In the FT-IR and TGA analyses, PEI served as a stabilizer, and it was confirmed that the percent yield of the Ag/AgBr-6 was as high as 91.6%.

EXPERIMENTAL EXAMPLE 7

Photocatalytic Performance of Ag/AgBr Hybrid Nanostructures

Methyl blue (MB) was chosen as a target organic compound to investigate visible light-driven photocatalytic performance of various prepared photocatalysts. Each photocatalyst (30.0 mg) was dispersed in 30 mL of a MB aqueous solution (10 mg/L). The mixture was stored under darkness while being stirred for 30 minutes to establish absorption-desorption equilibrium of MB molecules on the photocatalysts. The photocatalytic test was conducted under visible light irradiation using a 200 W mercury xenon lamp (Raynics, Korea). Aliquots of the suspension (2.0 mL) were removed from the reaction system at different reaction times and centrifuged at 10,000 rpm in order to remove the photocatalysts from the solution. Supernatants were transferred to a UV-vis cuvette and their absorption spectra were measured in the range of 300 nm to 800 nm. The photocatalysts were centrifuged, washed, and collected for recycling experiments. Each photocatalyst (30.0 mg) was suspended in 50 mL of MO (20 mg/L) in order to measure the photocatalytic performance of Ag/AgBr and Ag/AgCl photocatalysts, and the other processes were conducted in the same manner as the above.

FIG. 29a shows a schematic diagram of the proposed degradation mechanism of MB using Ag/AgBr photocatalysts, FIG. 29b shows UV-vis absorption spectra for photocatalytic degradation of MB molecules using Ag/AgBr-2 under visible light irradiation, and FIGS. 29c and 29d show graphs for photocatalytic degradation of MB using Ag/AgBr hybrid nanostructures. FIG. 29c shows the normalized concentration of MB for different photocatalysts on a linear scale, and FIG. 29d shows the normalized concentrations of MB for different photocatalysts on a logarithmic scale. As shown in FIG. 29a, photocatalytic properties of the Ag/AgBr hybrid nanostructures were investigated by the degradation of organic pollutants under visible light irradiation. MB was chosen as a model for an organic pollutant in order to measure the photocatalytic performances. The present inventors investigated the photodegradation process by monitoring the intensity of the main absorption peaks at λ=665 nm associated with MB as a function of time. As shown in FIG. 29b, when the Ag/AgBr-2 photocatalyst was used as a function of irradiation time, photocatalytic curves of MB were plotted over a certain time interval. As the photocatalytic reaction was proceeded after the addition of the photocatalyst, the intensity of the absorption peaks at λ=665 nm was rapidly decreased, revealing that MB molecules can be efficiently degraded by visible light irradiation in the presence of the Ag/AgBr hybrid nanostructures. For comparison, the present inventors conducted the degradation reaction of MB using N-doped $TiO_2$ (P-25) which is a reference catalyst under visible light irradiation. FIG. 29c shows the concentration (C) of the normalized MB against the concentration at the start of the reaction ($C_0$) using various Ag/AgBr hybrid nanostructures in the photocatalytic reaction. FIG. 29d plots the normalized concentration on a logarithmic scale against reaction time, showing that the degradation reaction of MB has a first order reaction formula.

$$dC/dt = -kC, \quad (1)$$

$$\ln(C/C_0) = -kt, \quad (2)$$

wherein, k is the rate constant. Under similar photocatalytic conditions, P-25 showed both low photocatalytic activity and a rate constant of $6.2 \times 10^{-5}$ $min^{-1}$. As shown in FIG. 29d, for Ag/AgBr hybrid nanostructures, the rate constant was 0.0043 $min^{-1}$ for Ag/AgBr-0.2, 0.0096 $min^{-1}$ for Ag/AgBr-0.6, 0.0106 $min^{-1}$ for Ag/AgBr-1, 0.0602 $min^{-1}$ for Ag/AgBr-2, and 0.0179 $min^{-1}$ for Ag/AgBr-4. A comparison of the experimental results revealed that the degradation rate of MB by Ag/AgBr-2 was faster than Ag/AgBr-0.2, 0.6, 1.0, 4, and P-25 by factors of 14, 6, 6, 3 and 977, respectively, showing that the photocatalytic activity of the Ag/AgBr-2 nanostructures is much faster than that of P-25 and other Ag/AgBr hybrid nanostructures. The excellent visible light driven photocatalytic activity of Ag/AgBr-2 hybrid nanostructures is attributed to the positive synergistic effect between metallic Ag and semiconducting AgBr. Although Ag/AgBr-4 (90.38%) contains a large metallic Ag atomic weight compared to that of Ag/AgBr-2, the semiconducting AgBr with low level limits MB degradation.

EXPERIMENTAL EXAMPLE 8

Recycle of Ag/AgBr Hybrid Nanostructures

In addition to efficiency, renewable catalytic activity or stability is another significant point for industrial applications because photocatalysts often lose their photocatalytic performance by photo-corrosion during the reaction. In order to test the stability of the Ag/AgBr-2 hybrid nanostructures, recycling photodegradation experiments for MB were conducted five times under the same experimental conditions after centrifugal separations. FIG. 30 shows photodegradation kinetics of MB for five consecutive cycles with the same batch of Ag/AgBr-2. FIG. 30 shows that the catalytic activity of the Ag/AgBr-2 is still maintained at a high level after conducting the experiments for MB degradation five times. The slight decrease in the decomposition percentage of MB during the recycle reaction is caused by the loss of photocatalysts during centrifugal separations after every cycle. These results inhibit that the Ag/AgBr hybrid nanostructures has an excellent stability against photo-corrosion.

EXPERIMENTAL EXAMPLE 9

Comparison of Ag/AgCl Hybrid Nanostructures and Ag/AgBr Hybrid Nanostructures

In previous research of the photocatalytic performance of Ag/AgBr and Ag/AgCl, it was reported that Ag/AgBr exhibits a high activity due to its small band gap (2.6 eV) and low affinity of Br in Ag/AgBr. FIGS. 31a and 31b show UV-vis absorption spectra for photocatalytic degradation of MO molecules using different photocatalysts; a) Ag/AgBr-2 and b) Ag/AgCl hybrid nanostructures. FIG. 31c shows the normalized concentrations of MO for Ag/AgBr and Ag/AgCl photocatalysts on a linear scale, and FIG. 31d shows the rate constant (k) exhibiting the catalytic activity of Ag/AgBr and Ag/AgCl photocatalysts towards MO degradation. As shown in FIGS. 31a and 31b, the comparison experiment between Ag/AgBr and Ag/AgCl hybrid nanostructures was conducted in order to compare the photocatalytic performance by degrading MO under similar experimental conditions. As reported previously, approximately 154.2 nm±26.3 nm-sized Ag/AgCl hybrid nanostructures containing about 81 atomic % of metallic Ag were synthesized by a similar synthetic method for Ag/AgBr hybrid nanostructures. The size and content of metallic Ag in each of the hybrid nanostructures were almost the same. As shown in FIG. 31c, the MO degradation using the Ag/AgBr-2 was completed within 15 minutes, but the Ag/AgCl hybrid nanostructures required 30 minutes. Additionally, as shown in FIG. 31d, the rate constant for Ag/AgBr and Ag/AgCl was estimated to be 0.238 $min^{-1}$ and 0.163 $min^{-1}$, respectively. These results demonstrate that the Ag/AgBr hybrid nanostructures have better photocatalytic performance compared to Ag/AgCl under visible light irradiation.

The photocatalytic efficiency of the Ag/AgX hybrid nanostructures prepared according to an exemplary embodiment of the present invention degrades methyl blue (MB), which is a target pollutant that is relatively difficult to degrade. Therefore, the photocatalytic performance of such hybrid nanostructures can be confirmed. For example, the Ag/AgBr hybrid nanostructures may exhibit the improved photocatalytic activity and recyclability for MB degradation under visible light irradiation due to a shorter band gap (2.6 eV) and strong SPR effects. In particular, the Ag/AgBr hybrid nanostructures may exhibit a photocatalytic reaction rate which is 1,000-fold faster than commercialized N-doped $TiO_2$ (P-25). Additionally, the Ag/Ag hybrid nanostructures may exhibit the higher photocatalytic activity for MO degradation under visible light irradiation compared to the Ag/AgCl hybrid nanostructures. FIG. 32a shows $\ln(C/C_0)$ according to reaction times for MB degradation of N-doped $TiO_2$, Ag/AgCl, and Ag/AgBr-2 photocatalysts. In addition, FIG. 32b shows the rate constant (k) for MB degradation of N-doped $TiO_2$, Ag/AgCl, and Ag/AgBr-2 photocatalysts.

The invention claimed is:
1. A hybrid nanostructured photocatalyst, comprising:
   a first nanoparticle comprising silver halide (AgX), wherein X is any of Cl, Br, and I;
   multiple second nanoparticles in a dendritic form on an outer surface of the first nanoparticle and comprising Ag; and
   a polymer formed on any one outer surface of the first nanoparticle and the multiple second nanoparticles.
2. The hybrid nanostructured photocatalyst of claim 1, wherein the first nanoparticle has at least one shape selected from the group consisting of a semi-sphere, a sphere, a truncated-cube, and a cube.
3. The hybrid nanostructured photocatalyst of claim 1, wherein the second nanoparticle is formed on the outer surface of the first nanoparticle, and the shape of the hybrid nanostructured photocatalyst is formed to correspond to the shape of the first nanoparticle.

4. The hybrid nanostructured photocatalyst of claim 1, wherein at least a part of the first nanoparticle and the second nanoparticle has a crystal structure.

5. The hybrid nanostructured photocatalyst of claim 1, wherein at least a part of the first nanoparticle and the second nanoparticle has a face-centered cubic structure.

6. The hybrid nanostructured photocatalyst of claim 1, wherein the photocatalyst has a band gap energy of 2.0 eV to 3.0 eV and a photocatalytic activity in a visible light region.

7. The hybrid nanostructured photocatalyst of claim 1, wherein the first nanoparticle has a size of 100 nm to 400 nm and the second nanoparticle has a size of 5 nm to 25 nm.

8. The hybrid nanostructured photocatalyst of claim 1, wherein the polymer is at least one selected from the group consisting of polyethyleneimine (PEI), polyvinylpyrrolidone (PVP), polyethylene glycol (PEG), and polyvinyl alcohol (PVA).

9. The hybrid nanostructured photocatalyst of claim 1, wherein the weight ratio between the first nanoparticle and the second nanoparticle is in a range of 1:0.03 to 1:0.76.

10. A method for preparing the hybrid nanostructured photocatalyst according to claim 1 comprising:
1) preparing an aqueous solution containing a silver precursor;
2) preparing a first nanoparticle by introducing a polymer and an electrolyte salt into the aqueous solution containing a silver precursor; and
3) forming a second nanoparticle on an outer surface of the first nanoparticle by mixing with a reducing agent in step 2.

11. The method of claim 10, wherein step 2 further comprises controlling the shape of the first nanoparticle by heating, wherein the shape of the first nanoparticle is at least one selected from the group consisting of a semi-sphere, a sphere, a truncated-cube, and a cube.

12. The method of claim 10, wherein the silver precursor is at least one selected from the group consisting of $AgBF_4$, $AgCF_3SO_3$, $AgClO_4$, $AgNO_3$, $AgPF_6$, and $Ag(CF_3COO)$.

13. The method of claim 10, wherein the silver precursor in the aqueous solution has a concentration of 0.01 M to 3.0 M.

14. The method of claim 10, wherein the polymer is at least one selected from the group consisting of polyethyleneimine (PEI), polyvinylpyrrolidone (PVP), polyethylene glycol (PEG), and polyvinyl alcohol (PVA).

15. The method of claim 10, wherein the reducing agent is at least one selected from the group consisting of ascorbic acid, sodium hydroxide (NaOH), potassium hydroxide (KOH), hydrazine (N2H4), sodium hydrophosphate (NaH2PO4), glucose, tannic acid, dimethyl formamide (C3H7NO), tetrabutylammonium borohydride, sodium borohydride (NaBH4), calcium hydride (CaH2), sodium hydride (NaH), lithium hydride (LiH), and lithium borohydride (LiBH4).

16. The method of claim 10, wherein the reducing agent in the aqueous solution is added in a concentration of 0.1 mM to 15 mM.

17. The method of claim 10, wherein step 2 is conducted at between room temperature and 100° C.

* * * * *